US008858750B2

United States Patent
Sinykin

(10) Patent No.: US 8,858,750 B2
(45) Date of Patent: Oct. 14, 2014

(54) METHODS OF MANUFACTURING PAINT ROLLER COVERS FROM A TUBULAR FABRIC SLEEVE

(75) Inventor: Daniel L. Sinykin, Bayside, WI (US)

(73) Assignee: Seamless Technologies, LLC, Janesville, WI (US)

( * ) Notice: Subject to any disclaimer, the term of this patent is extended or adjusted under 35 U.S.C. 154(b) by 977 days.

(21) Appl. No.: 12/100,050

(22) Filed: Apr. 9, 2008

(65) Prior Publication Data

US 2008/0269033 A1    Oct. 30, 2008

Related U.S. Application Data

(63) Continuation-in-part of application No. 12/015,612, filed on Jan. 17, 2008, now Pat. No. 7,905,980, and a continuation-in-part of application No. 11/740,119, filed on Apr. 25, 2007, now Pat. No. 7,503,191.

(51) Int. Cl.
*B29C 65/00* (2006.01)
*B32B 37/00* (2006.01)
(Continued)

(52) U.S. Cl.
CPC ........... *B29C 63/18* (2013.01); *B29L 2031/328* (2013.01); *B29C 2063/485* (2013.01); *B29C 63/10* (2013.01); *B29C 2793/009* (2013.01); *B29C 63/48* (2013.01); *B05C 17/0207* (2013.01); *D04B 1/025* (2013.01)
USPC .......... 156/294; 156/86; 156/229; 156/308.2; 492/29; 492/48; 15/230; 15/230.11

(58) Field of Classification Search
CPC ........ B29C 63/40; B29C 65/00; B29C 65/02; B29C 65/18; B29C 65/20; B29C 66/5221; B32B 27/00; B32B 27/06; B32B 27/08; B32B 27/12; B32B 27/32; B32B 38/0004; B32B 38/0036; B32B 38/004; B32B 38/18; B32B 38/1808; B32B 38/1825; B32B 38/1833; B32B 38/1841; B32B 38/185; B05C 17/02; B05C 17/0207; B29L 2031/328
USPC ......... 156/71, 84, 85, 86, 148, 149, 196, 198, 156/212, 213, 229, 293, 294, 303.1, 72, 156/308.2, 309.6; 492/48, 28, 29; 15/230, 15/230.11
See application file for complete search history.

(56) References Cited

U.S. PATENT DOCUMENTS 1,791,741 A   2/1931 Moore
1,849,466 A   3/1932 Moore
(Continued)

FOREIGN PATENT DOCUMENTS

DE         19824405 A1 * 12/1999   .............. B05C 17/02
KR    1020010074645 A   8/2001

*Primary Examiner* — Philip Tucker
*Assistant Examiner* — Brian R Slawski
(74) *Attorney, Agent, or Firm* — Reinhart Boerner Van Deuren s.c.

(57) ABSTRACT

A method of manufacturing paint roller covers is disclosed in which the paint roller covers are manufactured from a seamless, tubular knitted pile fabric sleeve that is installed onto a core member. To facilitate the manufacture of the paint roller covers, the outside of the core member is provided with an adhesive bonding material on the exterior surface thereof that has a relatively non-tacky outer surface. The knitted pile fabric sleeve is installed onto the exterior surface of the core member over the adhesive bonding material. The adhesive bonding material is then rendered tacky, whereupon the knitted pile fabric sleeve becomes adhesively secured by the adhesive bonding material to the exterior surface of the core member. The pile fabric covered core member may be finished into paint roller covers by combing and shearing the pile fabric to a desired length, beveling the edges of the paint roller covers, and vacuuming stray fibers from the paint roller covers.

22 Claims, 8 Drawing Sheets

(51) Int. Cl.

| | |
|---|---|
| *C08J 5/00* | (2006.01) |
| *A01B 29/00* | (2006.01) |
| *B21B 1/40* | (2006.01) |
| *E01C 19/23* | (2006.01) |
| *B05C 11/00* | (2006.01) |
| *B25F 5/00* | (2006.01) |
| *B05C 1/00* | (2006.01) |
| *B05C 17/02* | (2006.01) |
| *B24D 13/14* | (2006.01) |
| *B44D 5/00* | (2006.01) |
| *B29C 63/18* | (2006.01) |
| *D04B 1/02* | (2006.01) |
| *B29L 31/32* | (2006.01) |
| *B29C 63/48* | (2006.01) |
| *B29C 63/10* | (2006.01) |

(56) References Cited

U.S. PATENT DOCUMENTS

| | | | |
|---|---|---|---|
| 2,600,955 A | 6/1952 | Barnes et al. | |
| 2,630,619 A | 3/1953 | Schmidt et al. | |
| 2,704,877 A | 3/1955 | Schmidt | |
| 2,737,702 A | 3/1956 | Schmidt et al. | |
| 2,752,953 A | 7/1956 | Schmidt | |
| 2,920,372 A | 1/1960 | Sannipoli et al. | |
| 2,944,588 A | 7/1960 | Sannipoli et al. | |
| 3,010,867 A | 11/1961 | Sannipoli et al. | |
| 3,181,233 A | 5/1965 | Sannipoli et al. | |
| 3,226,952 A | 1/1966 | Cassady | |
| 3,299,672 A | 1/1967 | Schmidt | |
| 3,732,135 A | 5/1973 | Ernst et al. | |
| 3,853,680 A | 12/1974 | Daniel | |
| 3,894,407 A | 7/1975 | Clingan et al. | |
| 3,894,409 A | 7/1975 | Clingan et al. | |
| 3,896,637 A | 7/1975 | Thore | |
| 4,236,286 A | 12/1980 | Abler et al. | |
| 4,245,487 A | 1/1981 | Schaab et al. | |
| 4,415,611 A | 11/1983 | Yamagata et al. | |
| 4,466,151 A | 8/1984 | Barch et al. | |
| 4,513,042 A | 4/1985 | Lumb | |
| 4,532,780 A | 8/1985 | Tilson et al. | |
| 4,546,020 A | 10/1985 | Sakai et al. | |
| 4,592,213 A | 6/1986 | Tilson et al. | |
| 4,692,975 A | 9/1987 | Garcia | |
| 4,798,748 A | 1/1989 | Kitamura et al. | |
| 5,206,968 A | 5/1993 | Bower et al. | |
| 5,294,276 A | 3/1994 | Linn et al. | |
| 5,339,484 A | 8/1994 | Polzin et al. | |
| 5,431,029 A | 7/1995 | Kuhrau et al. | |
| 5,537,745 A * | 7/1996 | Musch et al. | 29/895.211 |
| 5,546,768 A | 8/1996 | Kuhrau et al. | |
| 5,572,790 A | 11/1996 | Sekar | |
| 5,577,402 A | 11/1996 | Kuhrau et al. | |
| RE35,526 E | 6/1997 | Alvarez Garcia | |
| 5,685,176 A | 11/1997 | Kuhrau et al. | |
| 5,694,688 A | 12/1997 | Musch et al. | |
| 6,016,670 A | 1/2000 | Kuhrau et al. | |
| 6,151,920 A | 11/2000 | Schindler et al. | |
| 6,159,134 A * | 12/2000 | Sekar | 492/13 |
| 6,159,320 A | 12/2000 | Tams et al. | |
| 6,203,648 B1 | 3/2001 | Barton et al. | |
| 6,324,717 B1 | 12/2001 | Sekar | |
| 6,502,779 B1 | 1/2003 | Jelinek et al. | |
| 6,615,490 B2 | 9/2003 | Polzin | |
| 6,685,121 B1 | 2/2004 | Jelinek et al. | |
| 6,766,668 B2 * | 7/2004 | Sinykin | 66/191 |
| 6,902,131 B1 | 6/2005 | Jelinek et al. | |
| 6,918,552 B2 | 7/2005 | Jelinek et al. | |
| 6,929,203 B1 | 8/2005 | Jelinek et al. | |
| 6,993,941 B2 | 2/2006 | Yamaguchi | |
| 2002/0042331 A1 | 4/2002 | Fortner et al. | |
| 2002/0091051 A1 | 7/2002 | Sekar | |
| 2002/0104358 A1 | 8/2002 | Hart | |
| 2002/0112810 A1 | 8/2002 | Polzin et al. | |
| 2003/0213083 A1 * | 11/2003 | Yamaguchi | 15/230 |
| 2007/0056132 A1 | 3/2007 | Yamaguchi | |

* cited by examiner

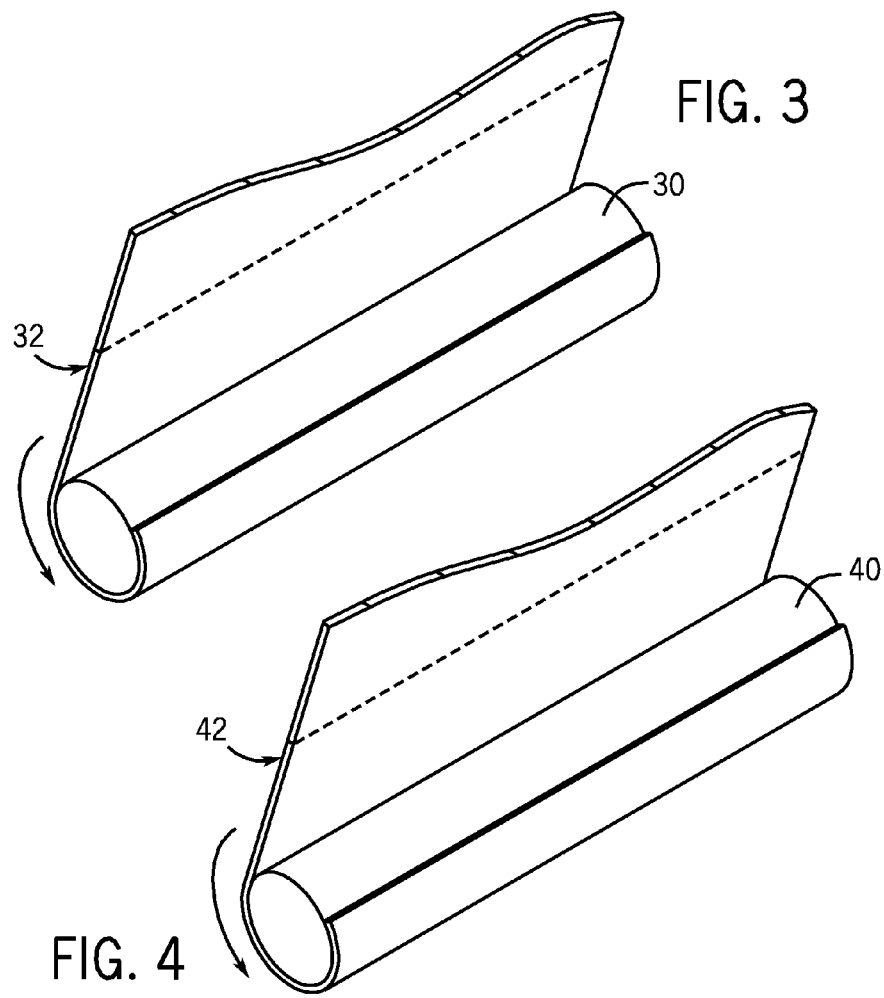
FIG. 3
FIG. 4
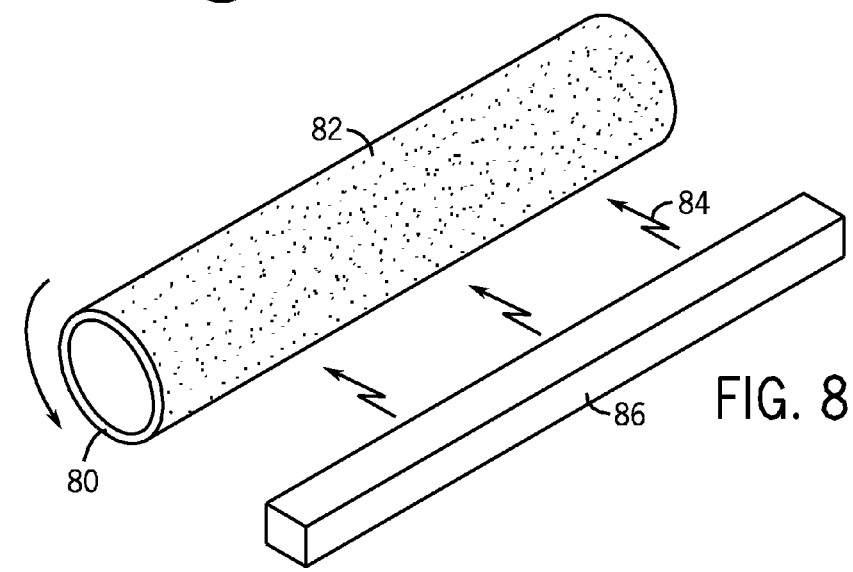
FIG. 8

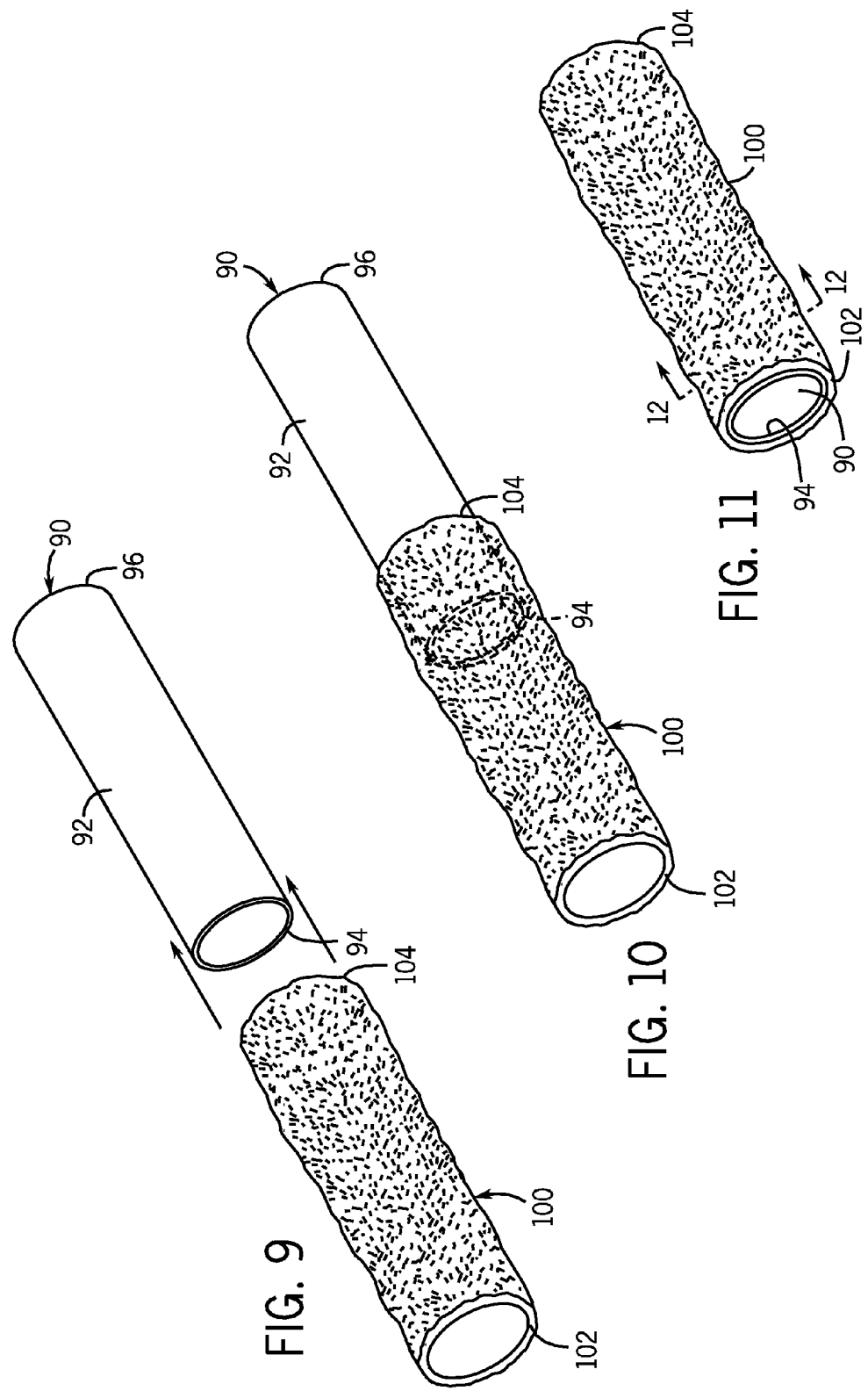

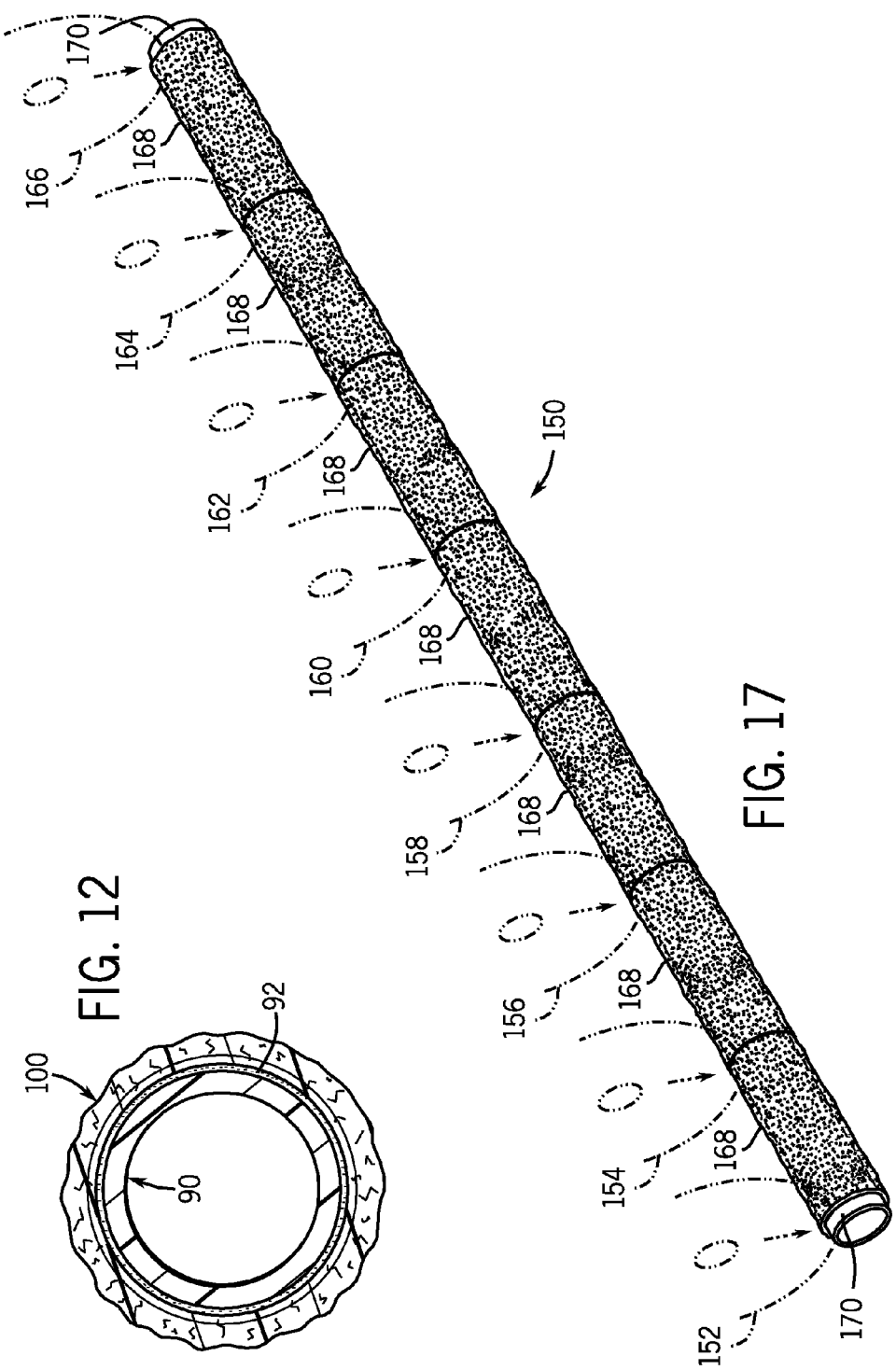

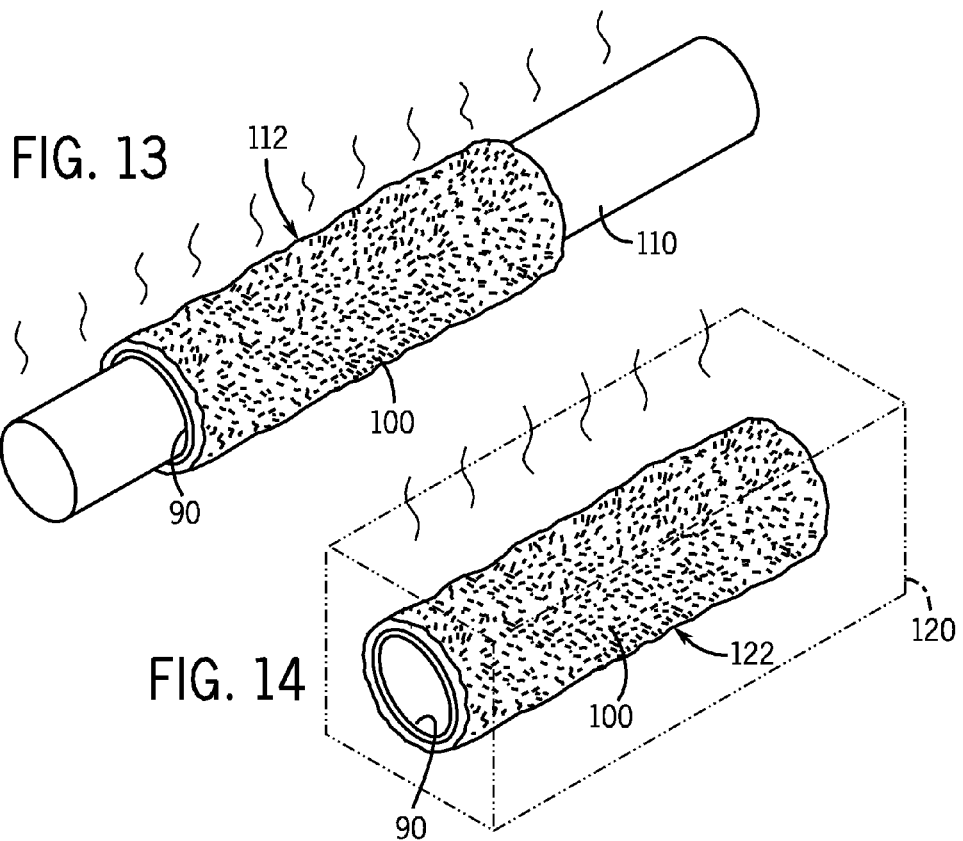
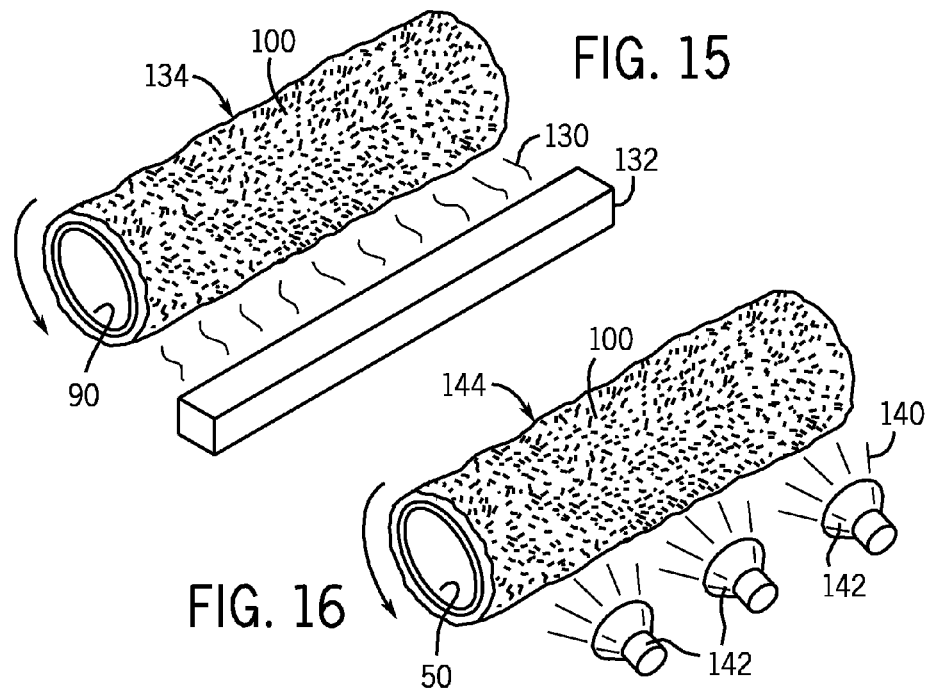

METHODS OF MANUFACTURING PAINT ROLLER COVERS FROM A TUBULAR FABRIC SLEEVE

IDENTIFICATION OF RELATED APPLICATION

This patent application is a continuation-in-part of U.S. patent application Ser. No. 12/015,612, filed on Jan. 17, 2008, now U.S. Pat. No. 7,905,980, entitled "Method of Manufacturing Paint Roller Covers From a Tubular Fabric Sleeve," and a continuation-in-part of U.S. patent application Ser. No. 11/740,119, filed on Apr. 25, 2007, now U.S. Pat. No. 7,503,191, entitled "Tubular Sliver Knit Fabric for Paint Roller Covers," both of which patent applications are assigned to the assignee of the present invention, and both of which patent applications are hereby incorporated herein by reference in their entirety.

BACKGROUND OF THE INVENTION

Field of the Invention

The present invention relates generally to the manufacture of paint roller covers, and more particularly to methods of manufacturing paint roller covers from a seamless, tubular fabric sleeve that is installed onto a hollow, cylindrical paint roller core member.

The two inventions which have had the greatest impact on paint application are the invention of the paint roller in the 1930's and the development of water-based paint in the late 1940's. While water-based paints are easy to mix, apply, and clean up, there is little doubt that the paint roller has been the greatest single time saving factor in the paint application process, allowing large surfaces to be painted with a uniform coat of paint quickly and easily. Typically, paint rollers are comprised of two components, namely a handle assembly and a paint roller cover for installation onto the handle assembly.

The handle assembly consists of a grip member having a generally L-shaped metal frame extending therefrom, with the free end of the metal frame having a rotatable support for a paint roller cover mounted thereon. The paint roller cover consists of a thin, hollow cylindrical core which fits upon the rotatable support of the handle, with a plush pile fabric being secured to the outer diameter of the paint roller cover. The core may be made of either cardboard or plastic material, with which material is used for the core generally being determined based upon the selling price of the paint roller cover. The pile fabric is traditionally applied as a strip which is helically wound onto the outer surface of the core with adjacent windings of the fabric strip being located close adjacent each other to provide the appearance of a single continuous pile fabric covering on the core.

Typically, the pile fabric is a dense knitted pile fabric, which may be knitted from natural fibers such as wool or mohair, synthetic fibers such as polyester, acrylic, nylon, or rayon, or from a blend of natural and synthetic fibers. The knitting is typically performed on a circular sliver knitting machine, which produces a tubular knitted base material with a knit-in pile in tubular segments which are approximately fifty-eight inches (1473 millimeters) in circumference by thirty to fifty yards (25 meters to 41.8 meters) long (depending on fabric weight).

Generally, sliver knitting is a knitting process which locks individual pile fibers directly into a lightweight knit backing or base material in a manner wherein the pile fibers extend from one side of the knit base material. The knit base material itself is made from yarn, which may be knit in a single jersey circular knitting process on a circular knitting machine, with closely packed U-shaped tufts of the fibers being woven into the knit base material which anchors them in the completed pile fabric. The free ends of the fibers extend from one side of the knit base material to provide a deep pile face. The knit base material is typically made of synthetic yarns, with the pile being made of a desired natural or synthetic fiber, or a blend of different fibers.

Such fabrics are illustrated, for example, in U.S. Pat. No. 1,791,741, to Moore, U.S. Pat. No. 2,737,702, to Schmidt et al., U.S. Pat. No. 3,226,952, to Cassady, U.S. Pat. No. 3,853,680, to Daniel, U.S. Pat. No. 3,894,409, to Clingan et al., U.S. Pat. No. 4,236,286, to Abler et al., U.S. Pat. No. 4,513,042, to Lumb, and U.S. Pat. No. 6,766,668, to Sinykin, all of which patents are hereby incorporated herein by reference. Sliver knit high pile fabrics have been widely used for many years in the manufacture of imitation fur fabrics, and also have found use, for example, as linings for overcoats and footwear, as coverings for stuffed toys and floors, in applications in pet beds, case liners, boot and slipper liners, medical pads, and blankets, and, of course, as coverings for paint roller covers.

The components of the knitted fabric are a yarn, which is used to knit the fabric's knit base material, and fibers which are supplied in a "sliver" rope, which consists of fibers which are all longitudinally oriented in a rope which is typically less than three inches (76 millimeters) in diameter.

The fibers are loose fibers of either a single type or a uniform blend of multiple types of fibers. The fiber mix will determine the performance, density, texture, weight, patterning, and color of the finished pile fabric.

The fibers are typically blown together in an air chamber to blend them, and then are carded in carding machines that "comb" the fibers to align them in parallel with each other. The fibers are then gathered into a soft, thick rope which is called "sliver" (which is the derivation for the term "sliver knit") or "roving." The yarn and the sliver are supplied to the circular knitting machine, which typically has eighteen heads and produces a tubular knit pile fabric which is approximately fifty-eight inches (1473 millimeters) in circumference. (Thus, when the tubular knit pile fabric is slit longitudinally, the fabric is approximately fifty-eight inches (1473 millimeters) wide.)

Such knitting machines are well known in the art, and are illustrated in U.S. Pat. No. 3,894,407, to Clingan et al., U.S. Pat. No. 3,896,637, to Thore, U.S. Pat. Nos. 4,532,780 and 4,592,213, both to Tilson et al., U.S. Pat. Nos. 5,431,029, 5,546,768, 5,577,402, 5,685,176, and 6,016,670, all to Kukrau et al., and U.S. Pat. No. 6,151,920, to Schindler et al., all of which patents are hereby incorporated herein by reference. Examples of commercial versions of such knitting machines are the Model SK-18 II Sliver Knitter and the Model SK-18J II Sliver Knitter which are available from Mayer Industries, Inc. of Orangeburg, S.C.

The first commercial circular sliver knitting machine had seven heads, and commercially-available circular knitting machines today have between seven and eighteen heads. Eighteen head knitting machines have upwards of one thousand needles, and produce tubular knitted segments that are approximately nineteen inches (483 millimeters) in diameter (fifty-eight inches (1473 millimeters) in circumference). All of these circular sliver knitting machines produce tubular knitted pile fabric segments having the pile located on the inside. Such circular sliver knitting machines are incapable of either producing tubular knitted pile fabric segments having the pile on the outside or small diameter tubular knitted pile fabric segments.

Following the manufacture of the tubular knitted pile segments on a circular sliver knitting machine, the tubular knitted pile segments are slit longitudinally to produce extended knitted pile segments of fabric which are typically fifty-eight inches (1473 millimeters) wide by thirty yards (27.43 meters) to fifty yards (45.72 meters) long. These extended knitted pile segments of fabric are then tensioned longitudinally and transversely, stretched to a 60 inch (1524 millimeter) width or greater to guarantee the proper number of two and seven-eighth inch (73 millimeter) strips, and back coated (on the non-pile side of the knit base material) with a stabilized coating composition such as a clear acrylic polymer. The coating composition which is coated onto the non-pile side of the knit base material is then processed, typically by heat, to stabilize the coated, extended knitted pile segment. The heating operation dries and bonds the coating composition to the knit base material, producing a fabric which is essentially lint-free.

The coated, extended knitted pile segment can then be subjected to a shearing operation to achieve a uniform pile length, with the sheared fibers being removed by vacuum, electrostatically, or by any other known removal technique. The pile density, the nap length, and the stiffness of the fibers are varied based upon custom specifications and the particular characteristics of the paint roller cover that are desired.

The sheared, coated, extended knitted pile segment is then slit into a plurality of two and seven-eighths inch (73 millimeter) wide knitted pile fabric strips, of which there are typically twenty for a sixty inch (1524 millimeter) wide fabric segment. Following this slitting operation, the strips must be vacuumed to remove stray fibers and lint. The knitted pile fabric strips are rolled onto a core to produce twenty rolls of knitted pile fabric strips, each of which is thirty to fifty yards long. These rolls of knitted pile fabric strips may then be shipped to a paint roller cover manufacturer. Alternately, a plurality of standard lengths of the fabric may be seamed together to produce an extended length fabric strip which may be helically wound in consecutive rows upon a core as taught in U.S. Pat. No. 6,502,779, U.S. Pat. No. 6,685,121, U.S. Pat. No. 6,902,131, U.S. Pat. No. 6,918,552, and U.S. Pat. No. 6,929,203, all to Jelinek et al., all of which patents are hereby incorporated herein by reference.

Both the standard length rolls of knitted pile fabric strips and the rolls of extended length knitted pile fabric strips have substantial material costs and labor costs that are incurred in the manufacturing process after the circular knitting process. The material costs include the cost of the coating material, losses due to fly (fly are extra fibers that come loose from the knitted pile fabric), losses during the cutting of the sixty inch (1524 millimeter) wide fabric segment into twenty knitted pile fabric strips, and seam losses throughout the operation. The labor costs include the costs to perform the coating process, the brushing, the second pass shearing, and all of the finishing steps within the traditional sliver knit operation including slitting and continuously coiling the fabric slits.

Paint roller covers are manufactured by using a hollow cylindrical core made of cardboard or thermoplastic material which has the knitted pile fabric strip helically wound around the core. During the manufacture of paint roller covers, the knitted pile fabric strips are secured to the core either by using adhesive or epoxy, or by thermally bonding the knitted pile fabric strip in place on a thermoplastic core. For examples of these manufacturing processes see U.S. Pat. No. 4,692,975, to Garcia (the "'975 patent"), U.S. Pat. No. 5,572,790, to Sekar (the "'790 Patent"), and U.S. Pat. No. 6,159,320, to Tams et al. (the "'320 patent"), each of which are hereby incorporated by reference.

The '975 patent uses a core that is cut from preformed thermoplastic (e.g., polypropylene) tubular stock. The core is mounted on a rotating spindle, and a movable carriage mounted at an angle to the spindle feeds a continuous strip of knitted pile fabric onto the core, with the carriage moving parallel to the spindle in timed relation to its rotation so that the knitted pile fabric strip is wound on the plastic core in a tight helix. Also mounted to the movable carriage is a heat source for heat softening the thermoplastic core just in advance of the point where the knitted pile fabric strip is applied to the thermoplastic core, such that the knitted pile fabric is heat bonded to the thermoplastic core as it is wound thereon. The bond formed between the knitted pile fabric and the thermoplastic core is a strong one not subject to separation from exposure to paint solvents.

The '790 patent uses a core that is formed from a strip (or multiple strips) of thermoplastic material that is (are) helically wound about a stationary mandrel. Alternately, the core may be formed by applying liquefied thermoplastic material to a drive belt which transfers the thermoplastic material to the mandrel. A layer of adhesive is then applied to the outer surface of the core, and the knitted pile fabric strip is applied to the core by helically winding the knitted pile fabric strip onto the core. Alternately, the paint roller cover may instead be made by bonding, in a single step, a knitted pile fabric strip to a wound strip of thermoplastic material that is wrapped about the mandrel.

The '320 patent extrudes a cylindrical plastic core through a rotating extruder head that is cooled, with the outer surface of the core then being plasma treated. The knitted pile fabric strip is secured onto the plasma treated outer surface of the core by extruding thin films of first and second epoxy resin subcomponents onto the outer surface of the core as it is extruded, cooled, and plasma treated in a continuous process.

Other variations are also known, particularly in technologies relating to manufacturing pile fabric suitable for use on paint roller covers. For example, instead of using knitted pile fabric, woven pile fabric can be substituted. Woven pile fabric consists of three yarns—a knit base material or warp yarn, a filling or weft yarn, and a pile yarn. The threads of warp yarn are held taut and in a parallel array on a loom, and the threads of weft yarn are woven across the threads of warp yarn in an over/under sequence orthogonal to the threads of warp yarn, with threads of pile yarn being woven into the weave of warp and weft yarns such that the threads of pile yarn extend essentially perpendicularly from one side of the fabric. Such woven pile fabric may be processed in a manner similar to that described above with regard to the processing of knitted pile segments of fabric to produce strips of woven pile fabric that can be helically wound onto paint roller cover cores.

However, all paint roller covers manufactured using the methods described above have a seam. As the strips of fabric are helically wound around the cores, the fabric strips wrap contiguously around the core, thereby creating a helical seam that is located throughout the cover. The seam inevitably produces a less than optimal paint roller cover since a seam can interfere with the uniform application of paint from the paint roller cover. The helical winding process of manufacturing a paint roller cover requires careful attention to contiguous winding. Errors resulting in overlapped fabric or gaps in the contiguous winding process often occur, resulting in increased scrap or marketing poor quality covers. Such seams have the potential, particularly with short nap paint roller covers, to produce a seam mark or stippling effect on the surface being painted, particularly if the paint being applied combines with the seams to produce a more pronounced defective characteristic in the surface being painted.

An examination of prior technology in the paint roller cover arts reveals that this problem has been recognized in the past, with several solutions that have been proposed to deal with the challenge presented by the presence of seams in paint roller covers. The first of these, U.S. Pat. No. 2,600,955, to Barnes et al., which patent is hereby incorporated herein by reference, discloses a paint roller cover made from a segment of canvas tubing that has yarn loops sewn therethrough, with the ends of the loops on the outside of the segment of the canvas tubing being cut. This approach is certainly far too expensive to represent a viable solution, and would not compare well to currently commercially available paint roller covers in the quality of the paint coat that could be applied.

Another approach is shown in U.S. Pat. No. 2,920,372, U.S. Pat. No. 2,944,588, and U.S. Pat. No. 3,010,867, all to Sannipoli et al., which patents are hereby incorporated herein by reference, which patents are related and disclose the use of a tubular knitted pile fabric manufactured on an apparatus disclosed in U.S. Pat. No. 1,849,466, to Moore, which patent is hereby incorporated herein by reference. The apparatus disclosed in Moore, which is hand operated, was stated in the Sannipoli et al. patents to be capable of manufacturing a seamless tubular knitted sleeve in which the pile is located on the interior of the sleeve, thereby requiring that the sleeve be inverted prior to mounting it on a core to form a paint roller cover. As such, the apparatus disclosed in Moore is incapable of manufacturing a knitted sleeve in which the pile is located on the exterior of the sleeve.

The Sannipoli et al. patents invert the tubular knitted sleeve by positioning it within a hollow tube and pulling one end of the tubular knitted sleeve around the end of the tube and pushing successive portions of the tubular knitted sleeve along the outside of the tube. When the fabric is inverted, the material of the fabric is deformed due to stretching that occurs during the process of inverting the tubular knitted sleeve. This deformation tends to increase the diameter of the tubular knitted sleeve, thus requiring it to be stretched lengthwise to restore it to its former diameter. Not only is this process difficult and expensive, but it also results in variable density of the fabric as well as introducing the prospect of adhesive or thermoplastic bleed-through within the stitches. Such problems will result in unacceptable product quality in paint roller covers made from this type of fabric.

It has been determined that the Sannipoli et al. method has three drawbacks that make it impracticable. The first drawback of the Sannipoli et al. method is that it requires a high degree of manual operation in that it requires cutting of the tubular knitted sleeves to size and placement of the tubular knitted sleeves into the tubes of the inverting machine. The second drawback of the Sannipoli et al. method is that only relatively short length tubular knitted sleeves representing a single paint roller cover (typically nine inches (229 millimeters)) can be processed at a time, which makes the method inherently unsuitable for mass production.

The third, and by far the most serious, drawback of the Sannipoli et al. method is that the process of inverting the tubular knitted sleeves inevitably results in stretching the tubular knitted sleeves so that they will not snugly fit on the paint roller cover cores, potentially creating creases in a high percentage of them when they are adhesively secured to the paint roller cover cores. This results in an unacceptably high percentage of them being defective and necessitating them being scrapped, resulting in an unacceptably high scrap cost. Predictably, the method taught in the Sannipoli et al. patents has never found commercial acceptance due to these serious disadvantages.

The above-incorporated by reference U.S. patent application Ser. No. 11/740,119 discloses a tubular knitted pile fabric which is manufactured with the pile side facing outwardly rather than inwardly and with a diameter suitable for mounting on a paint roller cover core in a seamless manner. While the tubular knitted pile fabric in this patent application is disclosed as being for installation onto a core member, the method used to install the tubular knitted pile fabric onto the outer surface of the core member is not disclosed.

The above-incorporated by reference U.S. patent application Ser. No. 12/015,612 discloses a method of manufacturing paint roller covers from the tubular knitted pile fabric sleeve by initially placing the tubular knitted pile fabric sleeve upon the outside of a thin hollow cylindrical mounting tube, providing an adhesive bonding material on the exterior surface of a core member, and inserting the core member into the interior of the mounting tube. By withdrawing the mounting tube from the knitted pile fabric sleeve while maintaining the respective positions of the knitted pile fabric sleeve and the core member, the knitted pile fabric sleeve is installed onto the exterior surface of the core member and retained thereupon by the adhesive bonding material. The pile fabric covered core member is then finished into paint roller covers by cutting it to a desired size, combing and shearing the pile fabric to a desired length, beveling the edges of the paint roller covers, and vacuuming stray fibers from the paint roller covers.

While this method of using mounting tubes to facilitate the installation of tubular knitted pile fabric sleeves onto core members has been found to be quite satisfactory, it is desirable to provide other methods by which a tubular pile fabric may be installed directly onto the outer surface of a core member. It is further desirable that the knitted pile fabric need not be significantly stretched during its installation onto the core member to ensure that when the tubular pile fabric is secured to the core member it will not have any wrinkles or other surface defects therein. It is also desirable that the tubular pile fabric, which is manufactured with the pile side out, need not be inverted during the process of installing it onto the core member.

It is highly desirable that the installation method permanently secure the tubular pile fabric to the core member in a manner whereby the tubular pile fabric closely conforms to the outer surface of the core member. In order to facilitate the mass manufacture of paint roller covers, it is also desirable that the method facilitate either the installation of a selected length of tubular pile fabric onto a core member of a desired finished length, or the installation of an extended length segment of the tubular pile fabric onto an extended length core member, which can be cut into segments of any desired size after the installation of the tubular pile fabric onto the core member. It is also desirable that a number of different technologies can be used to secure the knitted pile fabric to the core member.

The method used to install the tubular pile fabric onto the outer surface of a core member must result in a construction which is both durable and long lasting, and which, when installed, should yield a paint roller cover of superior quality in which the fabric is permanently fixed to the paint roller cover core. In order to enhance the market appeal of the method of the present invention, it should also minimize the cost of manufacture of paint roller covers when compared to conventional methods of manufacturing paint roller covers to thereby afford it the broadest possible market. Finally, it is also desirable that all of the aforesaid advantages and aspirations of the paint roller cover manufacturing method of the present invention be achieved without incurring any substantial relative disadvantage.

SUMMARY OF THE INVENTION

The disadvantages and limitations of the background art discussed above are overcome by the present invention. With this invention, a method of manufacturing paint roller covers is provided which installs and retains a tubular knitted pile fabric segment upon a core member. The tubular knitted pile fabric segment is provided with its pile side out in a size in which its interior diameter is approximately the same size as or slightly smaller than the outer diameter of a core member onto which it is to be installed (paint roller cover cores typically have an inner diameter of approximately one and one-half inches (38 millimeters) and an outer diameter of approximately one and five-eighths inches (41 millimeters) to one and three-quarters inches (44 millimeters), although alternative sizes such as inner diameters of one and three-quarters inches (44 millimeters) and two inches (51 millimeters) can be manufactured as well). Alternately, the tubular knitted pile fabric segment could also be slightly larger than the outer diameter of a core member onto which it is to be installed and shrunk slightly to closely fit the core member.

An adhesive bonding material is applied to the outer surface of the core member. This adhesive bonding material can either have a dry, and thus non-tacky, surface, or alternately if the adhesive bonding material is tacky when it is applied to the outer surface of the core member it must be applied in a manner whereby it becomes non-tacky after its application to the outer surface of the core member. A preferred adhesive bonding material having a dry surface is a dry adhesive film that can be heat-activated or UV-activated, and preferred adhesive bonding materials that can be applied and subsequently made non-tacky include UV-activated adhesives, hot melt adhesives, and thermal epoxies.

Since the outer surface of the core member having the adhesive bonding material thereupon is either dry or non-tacky, the tubular knitted pile fabric segment may be slid onto the core member. After the tubular knitted pile fabric segment is in place over the outer surface of the core member, the adhesive bonding material is caused to adhere the backing of the tubular knitted pile fabric segment to the outer surface of the core member. This may be accomplished by either heating and melting the adhesive bonding material to cause it to bond the tubular knitted pile fabric segment to the core member, or, in the case of a UV-activated adhesive, exposing it to a strong UV light to cause it to secure the tubular knitted pile fabric segment to the core member.

In an alternate embodiment, the entire core member and the adhesive bonding material may be made of the same material, such as a dry adhesive film that is wound on a non-stick mandrel and heated to cause it to form the core member. By applying heat from the inside and/or the outside after installing the tubular knitted pile fabric segment on the core member, the dry adhesive film constituting the core member can be melted to cause it to bond to the tubular knitted pile fabric segment. In another alternate embodiment, the tubular knitted pile fabric segment may have a backing that is made at least in part of a low melt material which, when exposed to heat from the inside and/or the outside after the tubular knitted pile fabric segment has been installed on the core member, will melt together with the adhesive bonding material to secure the tubular knitted pile fabric segment to the core member.

The pile fabric covered core assembly is finished by combing and shearing the pile fabric to the desired length. The edges of the unfinished paint roller covers are beveled, and any loose sliver fibers are then vacuumed off. The finishing of the pile fabric covered core assembly may be performed using the MBK Maschinenbau GmbH paint roller cover finishing machine, an Edward Jackson (Engineer) Limited finishing machine, or other equipment custom built by individual paint roller cover manufacturers.

It may therefore be seen that the present invention teaches a method by which a tubular pile fabric may be installed directly onto the outer surface of a core member. Further, the knitted pile fabric need not be significantly stretched during its installation onto the core member, thereby ensuring that when the knitted pile fabric is secured to the core member it will not have any wrinkles or other surface defects therein. The tubular pile fabric, which is manufactured with the pile side out, is not inverted during the process of installing it onto the core member.

The paint roller cover manufacturing method of the present invention permanently secures the tubular pile fabric to the core member in a manner whereby the tubular pile fabric closely conforms to the outer surface of the core member. In order to facilitate the mass manufacture of paint roller covers, the paint roller cover manufacturing method of the present invention facilitates both the installation of a selected length of tubular pile fabric onto a core member of a desired finished length, as well as the installation of an extended length segment of the tubular pile fabric onto an extended length core member, which can be cut into segments of any desired size after the installation of the tubular pile fabric onto the core member. Additionally, any of several different technologies can be used to secure the knitted pile fabric to the core member.

The method used to install the tubular pile fabric onto the outer surface of a core member results in a construction which is both durable and long lasting, and which, when installed, yields a paint roller cover of superior quality in which the fabric is permanently fixed to the paint roller cover core. The method of the present invention minimizes the cost of manufacture of paint roller covers when compared to conventional methods of manufacturing paint roller covers to thereby enhance its market appeal and afford it the broadest possible market. Finally, all of the aforesaid advantages and aspirations of the paint roller cover manufacturing method of the present invention are achieved without incurring any substantial relative disadvantage.

DESCRIPTION OF THE DRAWINGS

These and other advantages of the present invention are best understood with reference to the drawings, in which:

FIG. 3 is a schematic isometric depiction showing a segment of dry adhesive film not having a pressure-sensitive backing being wound around a core member;

FIG. 4 is a schematic isometric depiction showing a segment of UV-activated dry adhesive film being wound around a core member;

FIG. 8 is a schematic isometric depiction showing any one of the core members from FIGS. 5 through 6 with a liquid adhesive on the outer surface thereof having the outer surface cooled to render the adhesive non-tacky;

FIG. 9 is a schematic isometric depiction showing an end of a tubular paint roller cover fabric about to be slid onto the outer surface of one of the core members from FIGS. 1 through 7 over the non-tacky adhesive located on the outer surface of the core member;

FIG. 10 is a schematic isometric depiction of the tubular paint roller cover fabric and the non-tacky adhesive-covered core member shown in FIG. 9, with the tubular paint roller cover fabric being partially slid onto the non-tacky adhesive located on the outer surface of the core member;

FIG. 11 is a schematic isometric depiction of the tubular paint roller cover fabric and the non-tacky adhesive-covered core member shown in FIGS. 9 and 10, with the tubular paint roller cover fabric now covering the entire outer surface of the non-tacky adhesive-covered core member;

FIG. 12 is a cross-sectional depiction of the tubular paint roller cover fabric on the non-tacky adhesive-covered core member shown in FIG. 11;

FIG. 13 is a schematic isometric depiction of the tubular paint roller cover fabric on the non-tacky adhesive-covered core member located on a mandrel which is being heated to melt the adhesive on the core member to adhere the tubular paint roller cover fabric to the core member;

FIG. 14 is a schematic isometric depiction of the tubular paint roller cover fabric on the non-tacky adhesive-covered core member located in an oven which is being heated to melt the adhesive on the core member to adhere the tubular paint roller cover fabric to the core member;

FIG. 15 is a schematic isometric depiction of the tubular paint roller cover fabric on the non-tacky adhesive-covered core member having thermal heat applied to the outer surface thereof to melt the adhesive on the core member to adhere the tubular paint roller cover fabric to the core member;

FIG. 16 is a schematic isometric depiction of the tubular paint roller cover fabric on the non-tacky adhesive-covered core member having UV light applied to the outer surface thereof to activate the adhesive on the core member to adhere the tubular paint roller cover fabric to the core member;

FIG. 17 is a schematic isometric depiction showing a tubular paint roller cover fabric-covered core member having an extended length being cut into paint roller cover-size segments.

DETAILED DESCRIPTION OF THE EXEMPLARY EMBODIMENTS

A number of exemplary embodiments are discussed herein, it being understood that one skilled in the art could make any of a number of changes, modifications, variations, or alterations to the exemplary embodiments as described herein without departing from the spirit or scope of the present invention. The exemplary embodiments utilize the tubular knitted pile fabric disclosed in the above-incorporated by reference U.S. patent application Ser. No. 11/740,119, which discloses the tubular knitted pile fabric manufactured with the pile side facing outwardly and with a diameter suitable for mounting on a paint roller cover core. The tubular knitted pile fabric disclosed therein is a sliver knit fabric which uses fibers for the pile, but a tubular knitted pile fabric using yarn as the pile component (which will be the subject of another patent application) could be used as well. The exemplary embodiments taught herein each disclose how a segment of tubular knitted pile fabric may be installed and affixed onto a core member, following which the tubular knitted pile fabric-covered core member may subsequently be finished in conventional fashion.

Figure 1:
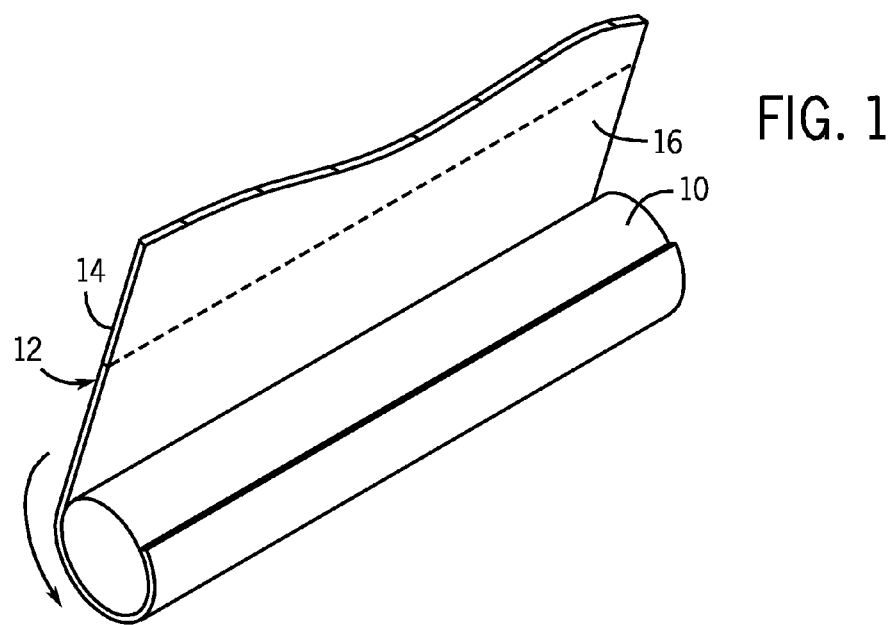
FIG. 1 is a schematic isometric depiction showing a wide segment of dry adhesive film having a pressure-sensitive backing being wound around a core member.

FIGS. 1 though 8 show several different embodiments for producing a core member that has non-tacky adhesive located on the outer surface of the core member. Referring first to FIG. 1, a core member 10 is shown being rotated as a wide segment of dry adhesive film 12 is being wound onto the core member 10. The core member 10 may be made of polypropylene or any other suitable material having the desired characteristics (including, for example, plastic or phenolic (coated paper) or cardboard). The length of the core member 10 may vary between approximately two inches (51 millimeters) and one hundred thirty-four inches (3404 millimeters), since it may initially be cut to the finished length of the paint roller cover, or alternately it may initially be cut to a longer length (which will subsequently be cut into the desired paint roller cover lengths after tubular knitted pile fabric (not shown in FIG. 1) has been secured to it).

The dry adhesive film 12 generally consists of a thin plastic film that is coated on one side (the side that will be wound facing outwardly) with a non-tacky adhesive 14, and may have a pressure-sensitive adhesive 16 on the opposite side to facilitate the installation of the dry adhesive film 12 onto the core member 10. (Alternately, a dry adhesive film may instead be adhered to a core member by the application of heating the dry adhesive film, for example by thermal or UV radiation, to cause it to fuse to the core member, as will become evident in conjunction with a discussion of FIGS. 2 and 3 below.) One dry adhesive film that may be used, for example, is Stock No. 233 from Lenderink Technologies in Belmont, Mich. The thickness of the dry adhesive film 12 may vary from approximately 0.0005 inches (0.0127 millimeters) thick to approximately 0.01 inches (0.254 millimeters) thick, with a thickness of approximately 0.0024 inches (0.061 millimeters) being the preferred thickness of the dry adhesive film 12. The thickness may be varied to an optimal degree in view of the particular core member as well as the application method.

Either one layer or multiple layers of the dry adhesive film 12 may be wound around the core member 10, with the number of layers of the dry adhesive film 12 being generally related to the thickness of the dry adhesive film 12 (the thinner the dry adhesive film 12 is, the more layers may be wound). For example, from one to seven layers of 0.0012 inch (0.0305 millimeter) thick dry adhesive film 12, and from one to three layers of thicker dry adhesive film 12 being used. The dry adhesive film 12 is cut when a sufficient length of the dry adhesive film 12 has been wound around the core member 10. Once the dry adhesive film 12 has been wound onto the core member 10, the entire outer surface of the core member 10 is covered with the dry adhesive film 12, with the non-tacky adhesive 14 side of the dry adhesive film 12 facing outwardly. Optionally, the dry adhesive film 12 can be heated (thermally or by UV light or otherwise cured) and then cooled if desired. This completes the installation of a non-tacky adhesive onto the outer surface of the core member 10, with the non-tacky adhesive-covered the core member 10 being ready for the installation of a segment of tubular knitted pile fabric (not shown in FIG. 1) which will be discussed below beginning with FIG. 9.

Figure 2:
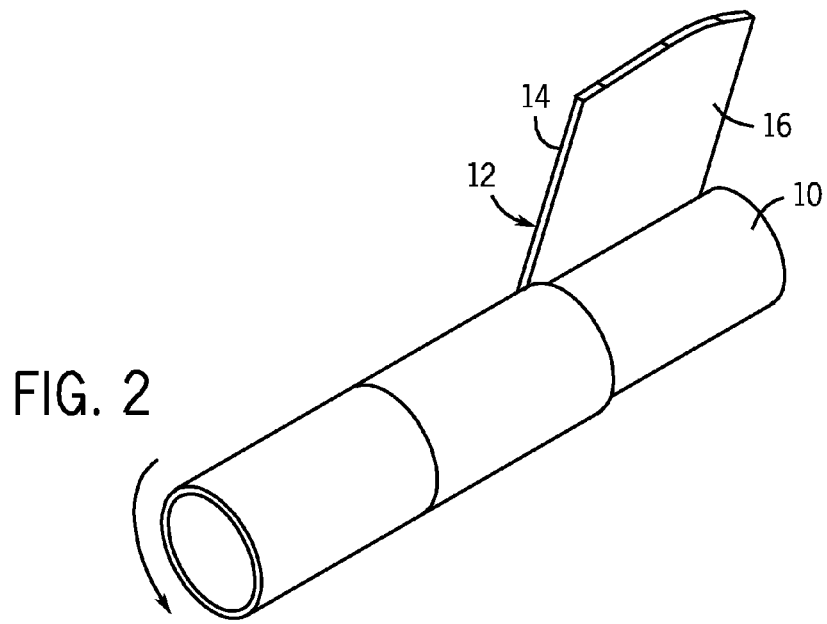
FIG. 2 is a schematic isometric depiction showing a segment of narrower dry adhesive film having a pressure-sensitive backing being helically wound around a core member.

Referring next to FIG. 2, another exemplary embodiment is shown in which a core member 20 is shown being rotated as a segment of narrower dry adhesive film 22 is being helically mound onto the core member 20, typically in slightly overlapping fashion, although contiguous helical wrapping may be used as well. The core member 20 may be made of polypropylene or any other suitable material having the desired characteristics (including, for example, plastic or phenolic (coated paper) or cardboard). The dry adhesive film 22 also consists of a thin plastic film that is coated on one side (the side that will be wound facing outwardly) with a non-tacky adhesive 24, and may have a pressure-sensitive adhesive 26 on the opposite side to facilitate the installation of the dry adhesive film 22 onto the core member 20. The same dry adhesive film referenced above in conjunction with the discussion of FIG. 1 may be used in this embodiment as well, with similar variations in thickness being possible as well.

The dry adhesive film 22 is cut when a sufficient length of the dry adhesive film 22 has been wound around the core member 20. Once the dry adhesive film 22 has been wound onto the core member 20, the entire outer surface of the core member 20 is covered with the dry adhesive film 22, with the non-tacky adhesive 24 side of the dry adhesive film 22 facing outwardly. Optionally, the dry adhesive film 12 can be heated (thermally or by UV light or otherwise cured) and then cooled if desired. This completes the installation of a non-tacky adhesive onto the outer surface of the core member 20, with the non-tacky adhesive-covered core member 20 being ready for the installation of a segment of tubular knitted pile fabric (not shown in FIG. 2) which will be discussed below beginning with FIG. 9.

Referring next to FIG. 3, yet another exemplary embodiment is shown in which a core member 30 is shown being rotated as a segment of dry adhesive film 32 is being helically mound onto the core member 30. The core member 30 may be made of polypropylene or any other suitable material having the desired characteristics (including, for example, plastic or phenolic (coated paper) or cardboard). The dry adhesive film 32 is made of a heat-activated non-tacky adhesive material (and does not use a pressure-sensitive adhesive). The dry adhesive film 32 may have similar variations in thickness to those of the embodiments shown in FIGS. 1 and 2.

The dry adhesive film 32 is cut when a sufficient length of the dry adhesive film 32 has been wound around the core member 30. Once the dry adhesive film 32 has been wound onto the core member 30, the entire outer surface of the core member 30 is covered with the dry adhesive film 32. This completes the installation of a non-tacky adhesive onto the outer surface of the core member 30, with the non-tacky adhesive-covered core member 30 being ready for the installation of a segment of tubular knitted pile fabric (not shown in FIG. 3) which will be discussed below beginning with FIG. 9. Optionally, if desired the dry adhesive film 32 can be heated to cause it to melt and become adhered to the core member 30, after which it is cooled and will again become non-tacky.

Referring next to FIG. 4, still another exemplary embodiment is shown in which a core member 40 is shown being rotated as a segment of dry adhesive film 42 is being helically mound onto the core member 40. The core member 40 may be made of polypropylene or any other suitable material having the desired characteristics (including, for example, plastic or phenolic (coated paper) or cardboard). The dry adhesive film 42 is made of a UV-activated non-tacky adhesive material (and does not use a pressure-sensitive adhesive). The dry adhesive film 42 may have similar variations in thickness to those of the embodiments shown in FIGS. 1 through 3.

The dry adhesive film 42 is cut when a sufficient length of the dry adhesive film 42 has been wound around the core member 40. Once the dry adhesive film 42 has been wound onto the core member 40, the entire outer surface of the core member 40 is covered with the dry adhesive film 42. This completes the installation of a non-tacky adhesive onto the outer surface of the core member 40, with the non-tacky adhesive-covered core member 40 being ready for the installation of a segment of tubular knitted pile fabric (not shown in FIG. 4) which will be discussed below beginning with FIG. 9. Optionally, if desired the dry adhesive film 42 can be exposed to high intensity UV light to cause it to melt and become adhered to the core member 40, after which it is cooled and will again become non-tacky. Alternately, this initial heating step mentioned may be skipped, with the dry adhesive film 42 wrapped around the core member 40 being carefully inserted into a tubular knitted pile fabric (not shown in FIG. 4) for a single curing operation that secured the tubular knitted pile fabric to the core member 40.

Figure 5:
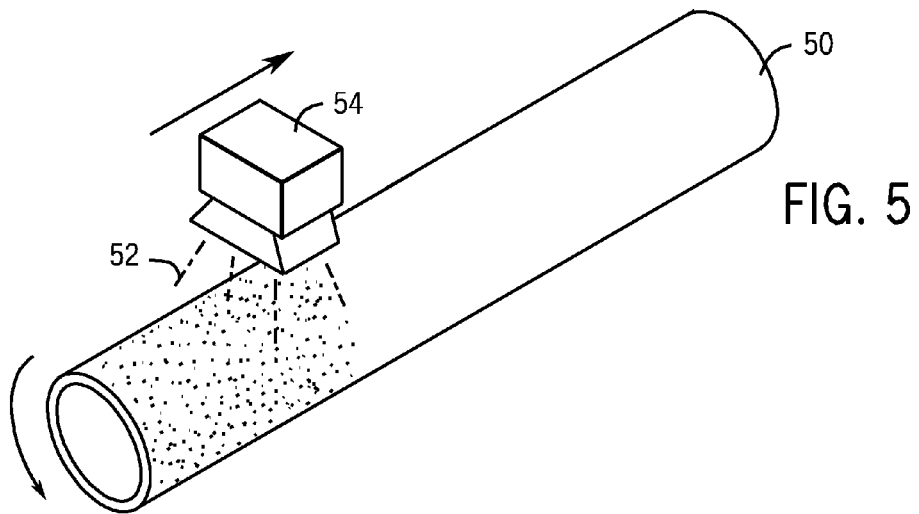
FIG. 5 is a schematic isometric depiction showing a liquid UV-activated adhesive being applied to the outer surface of a core member.

Referring next to FIG. 5, still another exemplary embodiment is shown in which a core member 50 is shown being rotated as a liquid UV-activated adhesive 52 is applied to the outer surface of the core member 50 by an applicator 54. The core member 50 may be made of polypropylene or any other suitable material having the desired characteristics (including, for example, plastic or phenolic (coated paper) or cardboard). Such a liquid UV-activated adhesive may, for example, be obtained from Fielco, LLC in Huntingdon Valley, Pa.

Following the application of the liquid UV-activated adhesive 52 to the core member 50, the liquid UV-activated adhesive 52 on the outer surface of the core member 50 will be tacky. Before the tacky adhesive-covered core member 50 is ready for the installation of a segment of tubular knitted pile fabric (not shown in FIG. 5) which will be discussed below beginning with FIG. 9, at least the outer surface of the liquid UV-activated adhesive 52 must be rendered non-tacky, which process will be discussed below in conjunction with FIG. 8.

Figure 6:
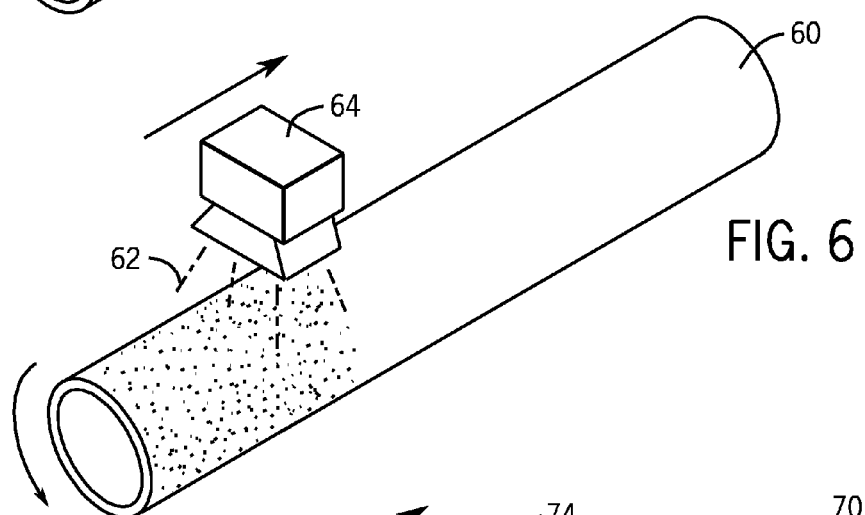
FIG. 6 is a schematic isometric depiction showing a liquid hot melt adhesive being applied to the outer surface of a core member.

Referring now to FIG. 6, yet another exemplary embodiment is shown in which a core member 60 is shown being rotated as a liquid hot melt adhesive 62 is applied to the outer surface of the core member 60 by an applicator 64. The core member 60 may be made of polypropylene or any other suitable material having the desired characteristics (including, for example, plastic or phenolic (coated paper) or cardboard). Such a liquid hot melt adhesive may be obtained, for example, from Fielco, LLC in Huntingdon Valley, Pa.

Following the application of the liquid hot melt adhesive 62 to the core member 60, the liquid hot melt adhesive 62 on the outer surface of the core member 60 will be tacky. Before the tacky liquid hot melt adhesive 62 covered core member 60 is ready for the installation of a segment of tubular knitted pile fabric (not shown in FIG. 6) which will be discussed below beginning with FIG. 9, at least the outer surface of the liquid hot melt adhesive 62 on the core member 60 must be rendered non-tacky, which process will be discussed below in conjunction with FIG. 8.

Figure 7:
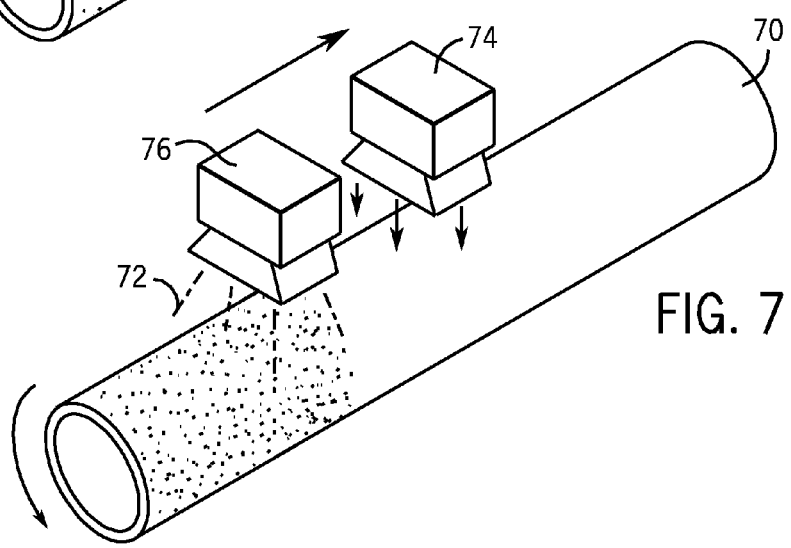
FIG. 7 is a schematic isometric depiction showing a core member having its outer surface plasma treated and thermal epoxy being applied to the outer surface of the core member.

Referring next to FIG. 7, another exemplary embodiment is shown in which a core member 70 is shown being rotated as an adhesive such as a thermal epoxy adhesive 72 is applied to the outer surface of the core member 70. The core member 70 may be made of polypropylene or any other suitable material having the desired characteristics (including, for example, plastic or phenolic (coated paper) or cardboard). Such a thermal epoxy adhesive may be obtained, for example, from Fielco, LLC in Huntingdon Valley, Pa.

In the exemplary embodiment illustrated in FIG. 7, the outer surface of the core member 70 may be treated with high voltage electrical plasma by a surface treater 74 in order to cause the outer surface of the core member 70 to attract and accommodate adhesive. (It should be noted that if a phenolic or cardboard core member is used instead of plastic, treatment by the surface treater 74 will not be required). A thin layer of the thermal epoxy adhesive 72 is applied to the treated outer surface of the core member 70 by an epoxy extrusion unit 76 or any other suitable mechanism.

Following the application of the thermal epoxy adhesive 72 to the core member 70, the thermal epoxy adhesive 72 on the outer surface of the core member 70 will be tacky. Before the tacky thermal epoxy adhesive 72 covered core member 70 is ready for the installation of a segment of tubular knitted pile fabric (not shown in FIG. 7) which will be discussed below beginning with FIG. 9, at least the outer surface of the thermal epoxy adhesive 72 on the core member 70 must be rendered non-tacky, which process will be discussed below in conjunction with FIG. 8.

Referring then to FIG. 8, a core member 80 covered with a liquid adhesive 82 (which may be any of the core member 50 covered with the liquid UV-activated adhesive 52, the core member 60 covered with the liquid hot melt adhesive 62, or the core member 70 covered with the thermal epoxy adhesive 72) is illustrated. The outer surface of the liquid adhesive 82 on the core member 80 is shown as being rendered non-tacky by a stream of cold air 84 from a schematically illustrated cooling unit 86 as the core member 80 is rotated. The cooling unit 86 may include a refrigeration unit (not shown herein), or it may more simply consist of a stream of ambient air that is directed onto tacky adhesive-covered outer surface of the core member 80.

The stream of cold air 84 is thus directed onto the liquid adhesive 82 to render at least the outer surface of the liquid adhesive 82 non-tacky. Alternately, the passage of a sufficient amount of time may also render the outer surface of the liquid adhesive 82 on the core member 80 non-tacky. In either event, the non-tacky adhesive-covered the core member 80 is then ready for the installation of a segment of tubular knitted pile fabric (not shown in FIG. 8) which will be discussed below beginning with FIG. 9.

Referring now to FIG. 9, a core member 90 that is covered with a non-tacky adhesive 92 (which may be any of the core member 10 covered with the dry adhesive film 12, the core member 20 covered with the dry adhesive film 22, the core member 30 covered with the dry adhesive film 32, the core member 40 covered with the dry adhesive film 42, the core member 50 covered with non-tacky liquid UV-activated adhesive 52, the core member 60 covered with non-tacky liquid hot melt adhesive 62, or the core member 70 covered with non-tacky thermal epoxy adhesive 72) is illustrated. The core member 90 has a first end 94 and a second end 96.

A segment of tubular knitted pile fabric 100 having a first end 102 and a second end 104 is shown as it is about to be pulled onto the exterior surface of the first end 94 of the core member 90. The tubular knitted pile fabric 100 has an inner diameter that is approximately the same size as or slightly smaller than the outer diameter of the core member 90, which outer diameter is typically approximately one and five-eighths inches (41 millimeters) to one and three-quarters inches (44 millimeters) (the inner diameter of the core member 90 is approximately one and one-half inches (38 millimeters), although alternative sizes such as inner diameters of one and three-quarters inches (44 millimeters) and two inches (51 millimeters) could be used as well). The tubular knitted pile fabric 100 may be sized to require that it be stretched slightly when it is placed onto the core member 90 in order to achieve the correct density and/or positioning. Alternately, the tubular knitted pile fabric segment 100 could also be slightly larger than the outer diameter of a core member onto which it is to be installed and shrunk slightly (through the subsequent application of heat which will be discussed below) to closely fit the core member 90.

The tubular knitted pile fabric 100 is of a length that corresponds to the length of the core member 90. For purposes of the example discussed herein, it will be assumed that the core member 90 is approximately nine inches (229 millimeters) long and that the tubular knitted pile fabric 100 is approximately nine to nine and one-quarter inches (235 millimeters) long, which are lengths that are selected to allow the core member 90 and the tubular knitted pile fabric 100 to be used for the manufacture of a single nine inch (229 millimeter) long paint roller cover. It will be appreciated by those skilled in the art that the core member 90 and the tubular knitted pile fabric 100 could alternately be sized for use in manufacturing a plurality of paint roller covers of any of several different lengths. For example, the core member 90 and the tubular knitted pile fabric 100 could each be approximately sixty-four inches (1626 millimeters) long, which is a sufficient length to allow them to be used for the manufacture of seven nine inch (229 millimeter) long paint roller covers.

Since inner diameter of the tubular knitted pile fabric 100 is approximately the same as the outer diameter of the core member 90, the tubular knitted pile fabric 30 need not be capable of substantial stretching when it is pulled onto the core member 90. The tubular knitted pile fabric 100 taught in the above-incorporated by reference U.S. patent application Ser. No. 11/740,119 is resilient and will closely fit the outer diameter of the core member 90.

In FIG. 9, the tubular knitted pile fabric 100 is shown with its second end 104 about to be pulled over the first end 94 of the core member 90. FIG. 10 shows the tubular knitted pile fabric 100 partly pulled onto the core member 90, and FIG. 11 shows the tubular knitted pile fabric 100 fully pulled onto the core member 90, with the first end 102 of the tubular knitted pile fabric 100 located adjacent to the first end 94 of the core member 90, and with the second end 104 of the tubular knitted pile fabric 100 located close adjacent to the second end 96 of the core member 90. A cross-sectional view of the tubular knitted pile fabric 100 as placed on the core member 90 in FIG. 11 is shown in FIG. 12. It will be appreciated that the tubular knitted pile fabric 100 has not yet been adhesively secured to the core member 90, since the non-tacky adhesive 92 has not yet adhered to the inside of the tubular knitted pile fabric 100.

FIGS. 13 though 16 show several different embodiments for causing the non-tacky adhesive located on the outer surface of the core member 90 to adhere to the inside of the tubular knitted pile fabric 100. Referring first to FIG. 13, the assembly consisting of the non-tacky adhesive 92 (shown in FIG. 12) covered core member 90 having the tubular knitted pile fabric 100 mounted thereupon is shown mounted onto a heated mandrel 110. By heating the heated mandrel 110 to melt or activate the non-tacky adhesive 92 (the surface temperature must be between approximately 250 degrees Fahrenheit (121 degrees Celsius) and 325 degrees Fahrenheit (163 degrees Celsius)), the non-tacky adhesive 92 non-tacky adhesive 92 between the core member 90 and the tubular knitted pile fabric 100 will melt, fusing the backing of the tubular knitted pile fabric 100 to the adhesive bonding material and the outer surface of the core member 90 to the adhesive bonding material, thereby producing a pile fabric covered core assembly 112.

Referring next to FIG. 14, the assembly consisting of the non-tacky adhesive 92 (shown in FIG. 12) covered core member 90 having the tubular knitted pile fabric 100 mounted thereupon is shown located in an oven 120. The oven 120 may use radiation, convection, or any other type of heating, potentially including microwaves, to heat the assembly consisting of the non-tacky adhesive 92 covered core member 90 having the tubular knitted pile fabric 100 mounted thereupon. By placing this assembly in the oven 120 and heating it until the non-tacky adhesive 92 reaches a surface temperature between approximately 250 degrees Fahrenheit (121 degrees Celsius) and 325 degrees Fahrenheit (163 degrees Celsius)), the non-tacky adhesive 92 between the core member 90 and the tubular knitted pile fabric 100 will melt, fusing the backing of the tubular knitted pile fabric 100 to the outer surface of the core member 90, thereby producing a pile fabric covered core assembly 122. It should be noted that a heated mandrel (like the embodiment shown in FIG. 13) could simultaneously be used to apply heat from the inside of the core member 90.

Referring then to FIG. 15, the assembly consisting of the non-tacky adhesive 92 (shown in FIG. 12) covered core member 90 having the tubular knitted pile fabric 100 mounted thereupon is shown being rotated in the path of thermal radiation 130 generated by a thermal radiation source 132. The thermal radiation 130 passes through the tubular knitted pile fabric 100 and causes the non-tacky adhesive 92 under the tubular knitted pile fabric 100 to melt. By placing this assembly in the direct path of the thermal radiation 130 and heating it until the non-tacky adhesive 92 reaches a surface temperature between approximately 250 degrees Fahrenheit (121 degrees Celsius) and 325 degrees Fahrenheit (163 degrees Celsius)) as the assembly is rotated, the non-tacky adhesive 92 between the core member 90 and the tubular knitted pile fabric 100 will melt and fuses the backing of the tubular knitted pile fabric 100 to the outer surface of the core member 90, thereby producing a pile fabric covered core assembly 134. It should be noted that a heated mandrel (like the embodiment shown in FIG. 13) could simultaneously be used to apply heat from the inside of the core member 90.

Referring next to FIG. 16, the assembly consisting of the UV-activated adhesive 52 (shown in FIG. 5) covered core member 50 having the tubular knitted pile fabric 100 mounted thereupon is shown being rotated in the path of UV radiation 140 generated by one or more UV radiation lamps 142. The UV radiation 140 activates and cures the liquid UV-activated adhesive 52 under the tubular knitted pile fabric 100 to melt. By placing this assembly in the direct path of the thermal radiation 140 at a power of approximately 200 WPI to 600 WPI to activate (or reactivate) the liquid UV-activated adhesive 52, the UW-activated adhesive 52 between the core member 50 and the tubular knitted pile fabric 100 melts and fuses the backing of the tubular knitted pile fabric 100 to the outer surface of the core member 50, thereby producing a pile fabric covered core assembly 144. It should be noted that a heated mandrel (like the embodiment shown in FIG. 13) could simultaneously be used to apply heat from the inside of the core member 50.

Finishing the unfinished paint roller covers 112, 122, 134, and 144 will include the steps of combing the pile of the knitted pile fabric on the unfinished paint roller covers 112, 122, 134, and 144 and shearing it to the desired length. Finally, the edges of the unfinished paint roller covers 112, 122, 134, and 144 are beveled, and any loose fibers are vacuumed off.

While the exemplary embodiment discussed above used a nine inch (229 millimeter) long core member 90 and a nine and one-quarter inch (235 millimeter) long tubular knitted pile fabric 100, the core member 90 and the tubular knitted pile fabric 100 could alternately be sized for use in manufacturing a plurality of paint roller covers of any of several different lengths. A pile fabric covered core assembly 150 shown in FIG. 17 is approximately sixty-four inches (1626 millimeters) long, and it can be cut into paint roller cover segments of any desired size. Eight cutting blades 152, 154, 156, 158, 160, 162, 164, and 166 are schematically shown (although a single cutting blade that moves in position with respect to the pile fabric covered core assembly 150 may be used instead) to cut the pile fabric covered core assembly 150 into seven nine inch (229 millimeter) long unfinished paint roller covers 168, with two short end pieces 170 being discarded. Alternatively, dual cutting blades mounted at angles can be used to simultaneously cut and bevel the edges of paint roller cover segments. The unfinished paint roller covers 168 would then be finished as described above.

Figure 18:
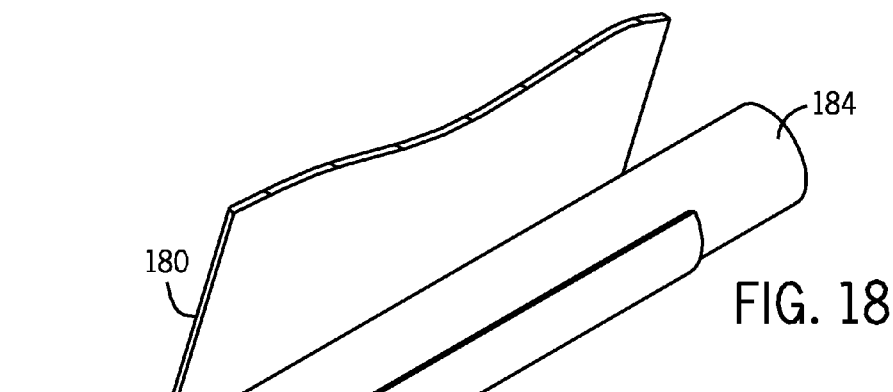
FIG. 18 is a schematic isometric depiction showing a wide segment of dry adhesive film beginning to be wound around a mandrel to form a core member from the dry adhesive film.
Figure 19:
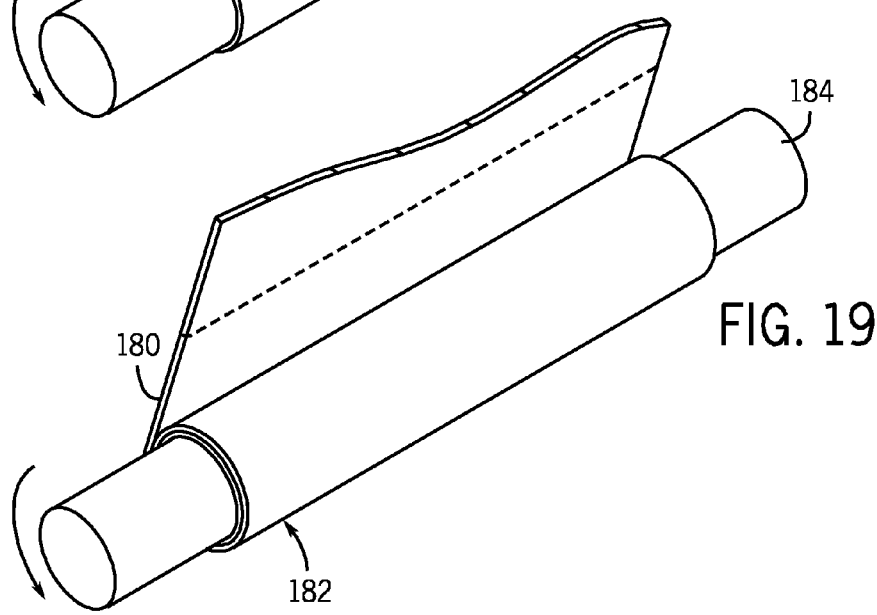
FIG. 19 is a schematic isometric depiction showing the nearly-complete core member formed of the segment of dry adhesive film that is being wound around the mandrel of FIG. 18.
Figures 20, 21:
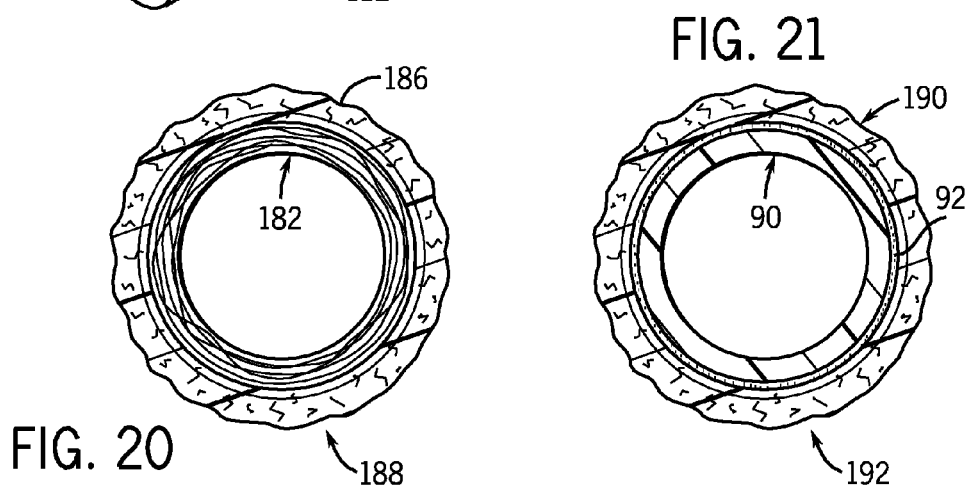
FIG. 20 is an end view of a core member formed by the method illustrated in FIGS. 18 and 19.
FIG. 21 is a cross-sectional view similar to the view depicted in FIG. 12, but with the tubular paint roller cover fabric being used having a base material made at least in part with a material having a lower melting point that will enhance the degree of adhesion with the adhesive covering the core member when they are subjected to heating.

There are several other alternate embodiments contemplated with regard to the practice of the paint roller cover manufacturing method of the present invention. Referring first to FIGS. 18 through 20, the use of dry adhesive film 180 to form a core member 182 is illustrated. One or more layers of the dry adhesive film 180 is wound around a mandrel 184 having its outer surface coated with a low coefficient of friction material such as silicone or polytetrafluoroethylene (PTFE, such as the material marketed by DuPont under the trademark TEFLON). The dry adhesive film 180 is cut when a sufficient length of the dry adhesive film 180 has been wound around the mandrel 184. The mandrel 184 may then be heated to fuse the layers of the dry adhesive film 180 into the core member 182.

Either one layer or multiple layers of the dry adhesive film 180 may be wound around the mandrel 184. The thickness of the dry adhesive film 180 may vary from approximately 0.0005 inches (0.0127 millimeters) thick to approximately 0.01 inches (0.254 millimeters) thick. For example, from one to seven layers of 0.0012 inch (0.0305 millimeter) thick dry adhesive film 180, and from one to three layers of thicker dry adhesive film 180 (0.0024 inch (0.61 millimeter) thick to 0.0072 inch (0.183 millimeter) thick) being used. By heating the mandrel 184 to melt or activate the dry adhesive film 180 (the surface temperature must be between approximately 250 degrees Fahrenheit (121 degrees Celsius) and 325 degrees Fahrenheit (163 degrees Celsius)), the layers of the dry adhesive film 180 will melt to fuse them together, thereby forming the core member 182. The core member 182 is then allowed to cool and become solid and non-tacky.

A segment of tubular knitted pile fabric 186 is then placed onto the cooled core member 182, as shown in cross-section in FIG. 20. At this point, the tubular knitted pile fabric 186 has not yet been adhesively secured to the core member 182, since the core member is solid and non-tacky. Preferably, heat is applied from either or both of the mandrel 184 and a location outside the core member 182, for example using the thermal radiation method shown in FIG. 15 and discussed in conjunction therewith. By placing the assembly consisting of the tubular knitted pile fabric 186 on the core member 182 in the direct path of thermal radiation and heating it until the dry adhesive film 180 reaches a surface temperature between approximately 250 degrees Fahrenheit (121 degrees Celsius) and 325 degrees Fahrenheit (163 degrees Celsius)) as the assembly is rotated, the dry adhesive film 180 forming the outer portion of the core member 182 will melt again, this time fusing the backing of the tubular knitted pile fabric 186 to the outer surface of the core member 182, thereby producing a pile fabric covered core assembly 188.

Alternately, the first heating and cooling step mentioned two paragraphs above may be skipped, with the layers of the dry adhesive film 180 wrapped around the mandrel 184 being carefully inserted into the tubular knitted pile fabric 186 for a single heating operation that will both form the core member 182 and secured the tubular knitted pile fabric 186 to the core member 182. If desired, pressure may be applied to the tubular knitted pile fabric 186 to urge it into contact with the dry adhesive film 180, although such pressure is not strictly required.

Another alternate embodiment of the paint roller cover manufacturing method of the present invention is shown in FIG. 21, and uses a segment of tubular knitted pile fabric 190 that is manufactured with a base material that is made at least in part with a material having a lower melting point than the rest of the tubular knitted pile fabric 190. For example, the fabric disclosed in U.S. Pat. No. 6,766,668, which is assigned to the assignee of the present patent application, and which patent is hereby incorporated by reference herein in its entirety, may be used.

The tubular knitted pile fabric 190 may be placed onto the non-tacky adhesive 92 covered core member 90 (or the core member 182 in FIGS. 18 through 20), and any of the methods shown in FIGS. 13, 14, and 15 and discussed in conjunction therewith may be used to adhere the tubular knitted pile fabric 190 to the core member 90. When the non-tacky adhesive 92 is melted, at least a portion of the fibers of the backing of the tubular knitted pile fabric 190 will also be melted, producing a pile fabric covered core assembly 192 having an enhanced degree of adhesion between the tubular knitted pile fabric 190 and the core member 90.

Figure 22:
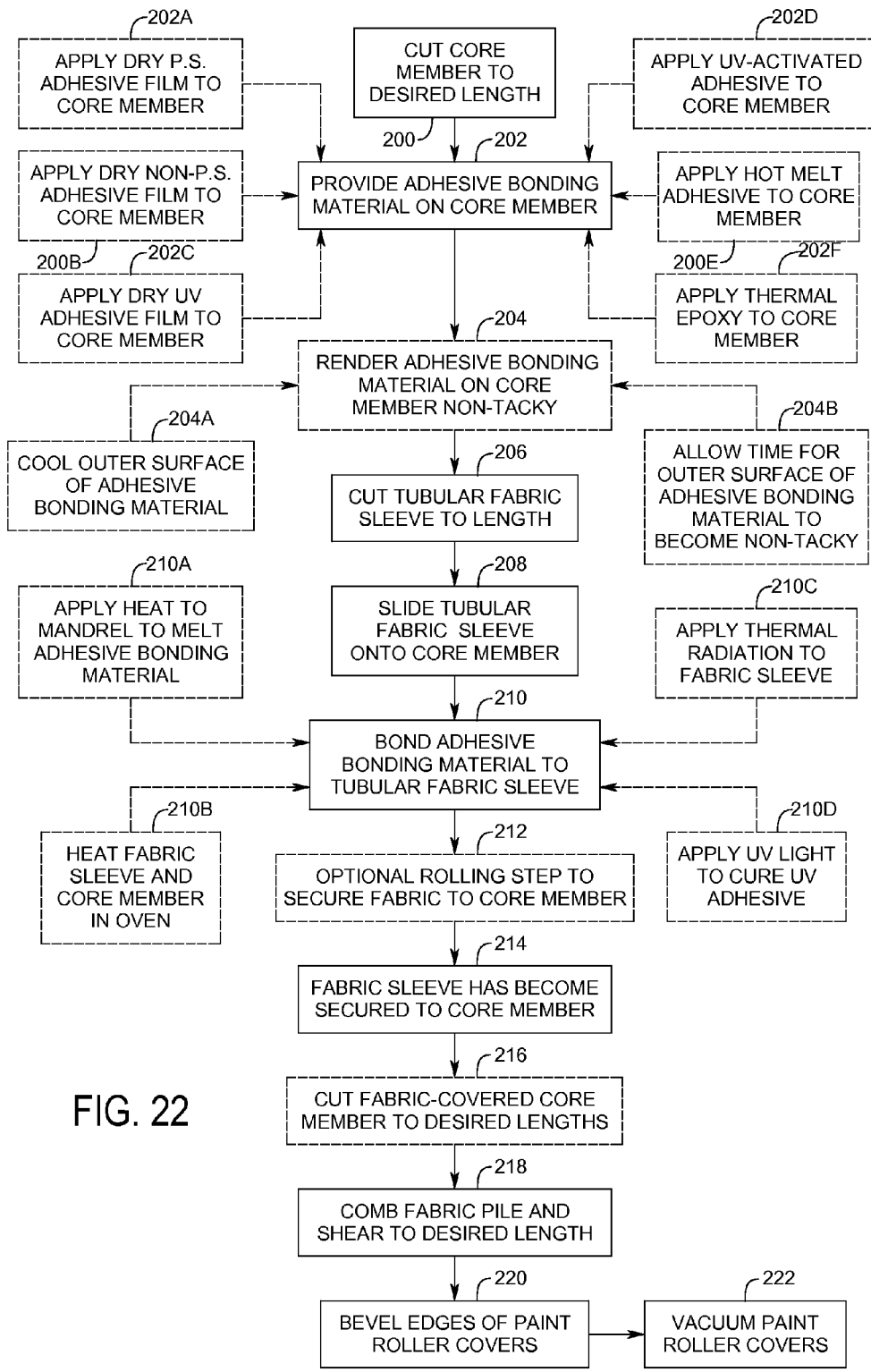
FIG. 22 is a flow diagram showing the manufacturing of a paint roller cover that is made according to the teachings of the present invention, with a number of the steps being those illustrated in FIGS. 1 through 21.

Referring finally to FIG. 22, the paint roller cover manufacturing method of the present invention is shown in a flow chart that includes a number of the variations discussed herein. The paint roller cover manufacturing operation starts in a cut core member to desired length step 200 in which a potentially longer segment of hollow cylindrical core member material is cut into a core member. The size of core member that the core member material is cut to may vary between approximately two inches (51 millimeters) and one hundred thirty-four inches (3404 millimeters) in length. It may be cut either to a longer core member segment (which will be cut into the desired paint roller cover lengths after the tubular knitted pile fabric has been secured to it), or alternately to the finished length of the paint roller cover.

Next, the process moves to a provide adhesive bonding material on core member segment step 202 in which an adhesive bonding material is provided on the outer surface of the core member. This may be done in any of several different manners, including the six that are uniquely identified in FIGS. 1, 3, 4, 5, 6, and 7. A first manner is represented in an apply dry pressure sensitive adhesive film to core member step 202A, which corresponds to the process shown in FIG. 1 in which the external surface of the core mandrel 10 has the pressure sensitive dry adhesive film 12 wrapped thereabout (or, alternately, in FIG. 2 in which the core member 20 has the pressure sensitive dry adhesive film 22 helically wrapped thereabout). This, of course, results in a non-tacky adhesive surface being disposed on the outer surface of the core member 10. Optionally, if desired, the dry adhesive film 12 can be heat activated to cause it to melt, after which it is cooled and will again become non-tacky.

A second manner is represented in an apply dry non-pressure sensitive adhesive film to core member step 202B, which corresponds to the process shown in FIG. 3 in which the external surface of the core member 30 has the non-pressure sensitive dry adhesive film 32 wrapped thereabout. This, of course, results in a non-tacky adhesive surface being disposed on the outer surface of the core member 30. Optionally, if desired, the dry adhesive film 32 can be heat activated to cause it to melt and become adhered to the core member 30, after which it is cooled and will again become non-tacky.

A third manner is represented in an apply UV-activated dry adhesive film to core member step 202C, which corresponds to the process shown in FIG. 4 in which the external surface of the core member 40 has the dry adhesive film 42 wrapped thereabout. This, of course, results in a non-tacky adhesive surface being disposed on the outer surface of the core member 40. Optionally, if desired, the dry adhesive film 42 can be UV activated to cause it to melt and become adhered to the core member 40, after which it is cooled and will again become non-tacky. Note for the second and third manners of providing an adhesive bonding material on the outer surfaces of the core members 30 and 40 that the dry adhesive films 32 and 42, respectfully, can be wound around the core members 30 and 40, respectively, and heated and then cooled and then reheated after the tubular knitted pile fabric 100 has been pulled onto the core members 30 and 40, respectively, or alternately can be wound around the core members 30 and 40, respectively, and retained in place until the tubular knitted pile fabric 100 has been pulled onto the core members 30 and 40, respectively.

A fourth manner is represented in an apply UV-activated adhesive to core member step 202D, which corresponds to the process shown in FIG. 5 in which the external surface of the core member 50 has the liquid UV-activated adhesive 52 applied thereto by the applicator 54. A fifth manner is represented in an apply hot melt adhesive to core member step 202E, which corresponds to the process shown in FIG. 6 in which the external surface of the core member 60 has the liquid hot melt adhesive 62 applied thereto by the applicator 64. A sixth manner is represented in an apply thermal epoxy to core member step 202F, which corresponds to the process shown in FIG. 7 in which the external surface of the core member 70 is treated with high voltage electrical plasma by a surface treater 58 and has a thin layer of epoxy 60 applied thereto by an epoxy extrusion unit 62. The last three manners of providing an adhesive bonding material on the outer surface of the core members 50, 60, and 70 all result in a liquid, tacky adhesive surface being disposed on the outer surface of the core members 50, 60, and 70.

For these last three manners of providing an adhesive bonding material on the outer surface of the core members 50, 60, and 70 (but not for the manner of providing an adhesive bonding material on the outer surface of the core member the core member 30 (or the core member 40), it is necessary to convert the tacky adhesive surface being disposed on the outer surface of the core members 50, 60, and 70 prior to proceeding to at least a non-tacky outer surface. This is done in a render adhesive bonding material on core member non-tacky step 204, which can be done in one of at least two different manners.

A first manner of the rendering the adhesive bonding material on the core member non-tacky is represented in a cool outer surface of adhesive bonding material step 204A, which corresponds to the process shown in FIG. 8 in which at least the outer surface of the liquid adhesive 82 on the core member 80 is cooled by the stream of cold air 84 from the cooling unit 86. A second manner of the rendering the adhesive bonding material on the core member non-tacky is represented in a time delay step 204B in which at least the outer surface of the liquid adhesive 82 on the core member 80 is allowed time for the outer surface (or the entire portion of the liquid adhesive 82) of the liquid adhesive 82 to become non-tacky, either by the contact of ambient air or by "skinning over." If dry adhesive film is used, of course the render adhesive bonding material on core member non-tacky step 204 is unnecessary.

The process next moves to a cut tubular fabric sleeve to length step 206 in which a segment of tubular knitted pile fabric is cut to a length that corresponds to the approximate length of the core member 90. If in the cut core member to desired length step 200 the core member 90 was cut to a longer core member segment (which will be cut into the desired paint roller cover lengths after the tubular knitted pile fabric has been secured to it), the tubular knitted pile fabric 100 is cut to fit over substantially all of the core member 90. For example, a sixty-four inch (1626 millimeters) segment of core material may be cut into seven nine-inch (229 millimeter) core members. If, on the other hand, the core member 90 was instead cut to the finished length of the paint roller cover, the tubular knitted pile fabric 100 is cut to a length that may be slightly longer that the core member 90. For example, for a nine inch (229 millimeter) core member 90, the tubular knitted pile fabric 100 may be cut to a length of approximately nine and one-quarter inches (235 millimeters).

The process then moves to a slide tubular fabric sleeve onto core member step 208 (as shown in FIGS. 9, 10, and 11) in which the tubular knitted pile fabric 100 is placed onto the non-tacky adhesive 92 covered the core member 90. The tubular knitted pile fabric 100 closely conforms to the non-tacky adhesive 92 covered outside surface of the core member 90.

Following this step, the process moves to a bond adhesive bonding material to tubular fabric sleeve step 210 in which the non-tacky adhesive 92 is caused to adhere to the tubular knitted pile fabric 100, securing it to the core member 90. This may be done in any of several different manners, including the four that are uniquely identified in FIGS. 13, 14, 15, and 16. A first manner is represented in an apply heat to mandrel step 210A, which corresponds to the process shown in FIG. 13 in which the core member 90 carrying the tubular knitted pile fabric 100 is placed on the heated mandrel 110, which is then heated to cause the non-tacky adhesive 92 to melt and bond the tubular knitted pile fabric 100 to the core member 90.

A second manner is represented in a heat fabric sleeve and core member in oven step 210B, which corresponds to the process shown in FIG. 14 in which the core member 90 carrying the tubular knitted pile fabric 100 is placed in the oven 120 and heated to cause the non-tacky adhesive 92 to melt and bond the tubular knitted pile fabric 100 to the core member 90. A third manner is represented in an apply thermal radiation to fabric sleeve step 210C, which corresponds to the process shown in FIG. 15 in which the thermal radiation 130 from the thermal radiation source 132 is applied to the tubular knitted pile fabric 100 and the core member 90 as they are rotated to cause the non-tacky adhesive 92 to melt and bond the tubular knitted pile fabric 100 to the core member 90. A fourth manner is represented in an apply UV light to cure UV adhesive step 210D, which corresponds to the process shown in FIG. 16 in which the UV radiation 140 from the UV radiation lamps 142 is applied to the tubular knitted pile fabric 100 and the core member 50 as they are rotated to cause the UV-activated adhesive 52 to bond the tubular knitted pile fabric 100 to the core member 50 and cure.

Optionally, a rolling to secure fabric to core member step 212 can then be used to use rollers or the like (not shown herein) to apply pressure onto the outside of the pile fabric covered core assembly 112, 122, 134, or 144 to enhance the bond created by the non-tacky adhesive 92 or the UV-activated adhesive 52 between the interior of the tubular knitted pile fabric 100 and the outer surface of the core member 90 or 50.

With or without the rolling to secure fabric to core member step 212, once the tubular knitted pile fabric 100 has been installed onto the core member 90 or 50 and the non-tacky adhesive 92 or the UV-activated adhesive 52 has been caused to adhere them together, the tubular knitted pile fabric 100 has become secured to the outer surface of the core member as noted in a fabric sleeve has become secured to core member step 214.

Next, in an optional cut fabric-covered core member to desired lengths step 216, the pile fabric covered core assembly 112, 122, 134, or 144 may be cut into a plurality of unfinished paint roller covers of any desired size. This step is, of course, not performed if the core member 90 or 50 was cut to its finished size in the cut core member to desired length step 200. The unfinished paint roller covers may then have the fabric pile thereupon combed and sheared to a desired length in a comb and shear fabric pile step 218. It should be noted that the comb and shear fabric pile step 218 may instead be performed before the cut fabric-covered core member to desired lengths step 216.

Next, in a bevel edges of paint roller covers step 220, the edges of the unfinished paint roller covers are beveled to finish them. Finally, in a vacuum paint roller covers step 212, loose fibers are vacuumed off the unfinished paint roller covers, finishing them into paint roller covers which may then be packaged and sold.

It may therefore be appreciated from the above detailed description of the exemplary embodiments of the present invention that it teaches a method by which a tubular pile fabric may be installed directly onto the outer surface of a core member. Further, the knitted pile fabric need not be significantly stretched during its installation onto the core member, thereby ensuring that when the knitted pile fabric is secured to the core member it will not have any wrinkles or other surface defects therein. The tubular pile fabric, which is manufactured with the pile side out, is not inverted during the process of installing it onto the core member.

The paint roller cover manufacturing method of the present invention permanently secures the tubular pile fabric to the core member in a manner whereby the tubular pile fabric closely conforms to the outer surface of the core member. In order to facilitate the mass manufacture of paint roller covers, the paint roller cover manufacturing method of the present invention facilitates both the installation of a selected length of tubular pile fabric onto a core member of a desired finished length, as well as the installation of an extended length segment of the tubular pile fabric onto an extended length core member, which can be cut into segments of any desired size after the installation of the tubular pile fabric onto the core member. Additionally, any of several different technologies can be used to secure the knitted pile fabric to the core member.

The method used to install the tubular pile fabric onto the outer surface of a core member results in a construction which is both durable and long lasting, and which, when installed, yields a paint roller cover of superior quality in which the fabric is permanently fixed to the paint roller cover core. The method of the present invention minimizes the cost of manufacture of paint roller covers when compared to conventional methods of manufacturing paint roller covers to thereby enhance its market appeal and afford it the broadest possible market. Finally, all of the aforesaid advantages and aspirations of the paint roller cover manufacturing method of the present invention are achieved without incurring any substantial relative disadvantage.

Although the foregoing description of the paint roller cover manufacturing method of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method of manufacturing a paint roller cover, comprising:
    providing an adhesive bonding material on an outer surface of a tubular core member having a first outer diameter and an interior having a first inner diameter, whereby at least the outer surface of said adhesive bonding material is rendered substantially non-tacky;
    placing a tubular knitted pile fabric sleeve having a first end and a second end, a pile side with pile extending outwardly, the pile side having a plurality of pile fibers extending outwardly therefrom a distance of between approximately three-eighths of an inch and four inches in length, and a backing side which is opposite said pile side, onto said outer surface of said tubular core member having said adhesive bonding material thereupon with its pile side out, said tubular knitted pile fabric sleeve having a second inner diameter prior to its placement onto said tubular core member; and
    subsequently causing said adhesive bonding material to become tacky, whereupon said tubular knitted pile fabric sleeve becomes secured to said outer surface of said tubular core member by said adhesive bonding material;
wherein the pile side is configured to apply paint to a worksurface.

2. A method as defined in claim 1, wherein said providing an adhesive bonding material step comprises:
    placing a segment of dry adhesive film onto said outer surface of said tubular core member.

3. A method as defined in claim 2, wherein said dry adhesive film is heated after it has been placed onto said outer surface of said tubular core member to cause said dry adhesive film to become adhered to said tubular core member, said dry adhesive film then cooling to become non-tacky.

4. A method as defined in claim 2, wherein said dry adhesive film has a pressure-sensitive adhesive located on a side of said dry adhesive film which faces said outer surface of said tubular core member to adhere said dry adhesive film to said tubular core member, an opposite side of said dry adhesive film being non-tacky until it is heated.

5. A method as defined in claim 2, wherein between one and seven turns of said dry adhesive film are placed onto said outer surface of said tubular core member.

6. A method as defined in claim 2, wherein said dry adhesive film is between approximately 0.0005 inches (0.0127 millimeters) and 0.01 inches (0.254 millimeters) thick.

7. A method as defined in claim 1, wherein said providing an adhesive bonding material step comprises:
    applying a hot melt adhesive onto said outer surface of said tubular core member.

8. A method as defined in claim 1, wherein said adhesive bonding material is rendered substantially non-tacky by cooling said adhesive bonding material.

9. A method as defined in claim 1, wherein said tubular knitted pile fabric sleeve comprises a backing that includes a fiber that is made at least in part with a material having a lower melting point than the rest of the tubular knitted pile fabric sleeve.

10. A method as defined in claim 1, wherein said tubular knitted pile fabric sleeve has an inner diameter that is slightly larger than, approximately the same size as, or smaller than the outer diameter of said core member.

11. A method as defined in claim 1, wherein said tubular knitted pile fabric sleeve and said tubular core member are both substantially longer than the length of a paint roller cover.

12. A method as defined in claim 11, additionally comprising:
    cutting the assembly comprising said tubular knitted pile fabric sleeve secured to said tubular core member into a plurality of unfinished paint roller covers each covered with knitted pile fabric having pile extending outwardly therefrom and each having edges located at opposite ends thereof.

13. A method as defined in claim 1, wherein said tubular core member is the length of a paint roller cover and wherein said tubular knitted pile fabric sleeve approximately the same length as or slightly longer than said tubular core member.

14. A method as defined in claim 1, wherein said causing said adhesive bonding material to become tacky step comprises:
    heating said adhesive bonding material to cause it to melt, said adhesive bonding material securing said tubular knitted pile fabric sleeve to said outer surface of said tubular core member when said adhesive bonding material solidifies upon the cessation of heating of said adhesive bonding material.

15. A method as defined in claim 14, wherein said tubular core member is placed upon a mandrel that is heated to cause said adhesive bonding material to melt.

16. A method as defined in claim 14, wherein said tubular knitted pile fabric sleeve and said tubular core member having said adhesive bonding material thereupon are placed into an oven to heat said adhesive bonding material to cause it to melt.

17. A method as defined in claim 14, wherein thermal radiation is directed onto said tubular knitted pile fabric sleeve to heat said adhesive bonding material to cause it to melt.

18. A method as defined in claim 14, wherein said adhesive bonding material comprises a hot melt adhesive.

19. A method as defined in claim 1, wherein said tubular knitted pile fabric sleeve secured to said tubular core member has pile extending outwardly therefrom and also has edges located at opposite ends thereof, said method additionally comprising:
- combing said pile of said knitted pile fabric secured to said tubular core member;
- shearing said pile of said knitted pile fabric secured to said tubular core member to the desired length;
- beveling said edges of said knitted pile fabric secured to said tubular core member; and
- vacuuming said pile of said knitted pile fabric secured to said tubular core member.

20. A method as defined in claim 1, additionally comprising:
- cutting said knitted pile fabric secured to said tubular core member into a plurality of unfinished paint roller covers each of a desired length;
- combing said pile of said knitted pile fabric on said unfinished paint roller covers;
- shearing said pile of said knitted pile fabric on said unfinished paint roller covers to the desired length;
- beveling said edges of said unfinished paint roller covers; and
- vacuuming said pile of said unfinished paint roller covers.

21. A method as defined in claim 1, wherein said core member is formed from at least one winding of said adhesive bonding material.

22. A method as defined in claim 1, wherein the tubular knitted pile fabric sleeve is an uninverted tubular knitted pile fabric sleeve manufactured with its pile side out.

* * * * *